US011731833B2

(12) United States Patent
Haid

(10) Patent No.: US 11,731,833 B2
(45) Date of Patent: Aug. 22, 2023

(54) CARGO RECEPTACLE, CARGO LOGISTICS METHOD AND CARGO LOGISTICS SYSTEM

(71) Applicant: PICK8SHIP TECHNOLOGY AG, Dübendorf (CH)

(72) Inventor: Josef A. Haid, Gockhausen (CH)

(73) Assignee: PICK8SHIP TECHNOLOGY AG, Dübendorf (CH)

( * ) Notice: Subject to any disclaimer, the term of this patent is extended or adjusted under 35 U.S.C. 154(b) by 90 days.

(21) Appl. No.: 17/056,820

(22) PCT Filed: May 22, 2019

(86) PCT No.: PCT/EP2019/063270
§ 371 (c)(1),
(2) Date: Nov. 19, 2020

(87) PCT Pub. No.: WO2019/224281
PCT Pub. Date: Nov. 28, 2019

(65) Prior Publication Data
US 2021/0155409 A1    May 27, 2021

(30) Foreign Application Priority Data

May 22, 2018 (CH) .................................. 00634/18

(51) Int. Cl.
B65G 1/137      (2006.01)
B65G 1/04       (2006.01)
B65G 65/00      (2006.01)
G06Q 10/08      (2023.01)

(52) U.S. Cl.
CPC ......... B65G 1/1375 (2013.01); B65G 1/0492 (2013.01); B65G 65/00 (2013.01); G06Q 10/08 (2013.01); B65G 2201/0258 (2013.01); B65G 2209/06 (2013.01)

(58) Field of Classification Search
CPC combination set(s) only.
See application file for complete search history.

(56) References Cited

U.S. PATENT DOCUMENTS 1,906,174 A      4/1933   Miller
2,224,537 A     12/1940   Cowan
8,301,294 B1 *  10/2012   Shakes ..................... B07C 5/38
                                                    700/214

(Continued)

FOREIGN PATENT DOCUMENTS

CN        2594160 Y      12/2003
DE    102010043475 A1     3/2012

(Continued)

OTHER PUBLICATIONS

International Search Report and Written Opinion for PCT/EP2019/063270 dated Dec. 12, 2019.

Primary Examiner — Kyle O Logan
(74) Attorney, Agent, or Firm — GrowIP Law Group LLC

(57) ABSTRACT

Cargo receptacle including a mount and a flexible member expandable and collapsible in height, wherein the flexible member in an at least partially expanded state bounds a storage volume for holding the cargo, and wherein the mount is self-supporting and comprises a frame with a rim, the rim being suitable for mounting the cargo receptacle and a system of laterally spaced-apart tracks.

23 Claims, 12 Drawing Sheets

(56) References Cited

U.S. PATENT DOCUMENTS

| | | | |
|---|---|---|---|
| 8,731,708 B2* | 5/2014 | Shakes | G06Q 10/087 700/216 |
| 9,558,472 B1* | 1/2017 | Tubilla Kuri | B25J 9/0093 |
| 10,239,739 B2* | 3/2019 | High | G06Q 30/0617 |
| 2005/0118003 A1* | 6/2005 | Mitchell | B65G 1/06 414/284 |
| 2006/0191930 A1 | 8/2006 | Godano | |
| 2007/0021863 A1 | 1/2007 | Mountz et al. | |
| 2007/0021864 A1 | 1/2007 | Mountz et al. | |
| 2007/0297879 A1* | 12/2007 | Yuyama | B62B 5/0083 280/79 |
| 2008/0122615 A1* | 5/2008 | Shoenfeld | G08B 13/14 700/218 |
| 2009/0071923 A1* | 3/2009 | Wang | A47B 88/90 211/85.17 |
| 2011/0089651 A1 | 4/2011 | De Bessa et al. | |
| 2013/0079917 A1* | 3/2013 | Deppermann | B07C 5/3425 700/214 |
| 2013/0112686 A1 | 5/2013 | Kwon | |
| 2014/0008360 A1 | 1/2014 | Philip | |
| 2017/0238700 A1* | 8/2017 | Davis | B65D 19/44 |
| 2018/0282075 A1* | 10/2018 | Allen | G05B 19/41895 |
| 2021/0155409 A1* | 5/2021 | Haid | B65G 1/1375 |

FOREIGN PATENT DOCUMENTS

| | | |
|---|---|---|
| EP | 1958885 A1 | 8/2008 |
| WO | 20170138377 A1 | 8/2017 |

* cited by examiner (a) (b)

CARGO RECEPTACLE, CARGO LOGISTICS METHOD AND CARGO LOGISTICS SYSTEM

CROSS-REFERENCE TO RELATED APPLICATION

This application claims the benefit of the filing date of international PCT Application No. PCT/EP2019/063270, filed on May 22, 2019, that in turn claims priority to Swiss Patent Application No. CH00634/18, filed on May 22, 2018, the contents of which are hereby incorporated by reference in their entirety.

TECHNICAL FIELD

The present disclosure relates to a cargo receptacle, a cargo receptacle cart, a vehicle for moving the cargo receptacle cart, a cargo logistics method and to a cargo logistics system.

BACKGROUND

Commerce has experienced considerable growth and improvement with respect to processes, technology, reliability and speed. However, last mile delivery methods have not changed significantly in the last 50 years, excepting the use of scanners for delivery confirmation and cargo tracking, for example. Recent growth of home delivery volumes and frequency (driven by faster delivery concepts) challenge cities and providers, for example when delivery trucks block streets and cause traffic jams. Attempts at solving this problem include local hubs to deliver cargo with electric cargo bikes, parcel lockers at post offices and super markets. In general, however, the logistics involved are still complex, inflexible, and expensive. The latter is due in part to the investments required for providing storage spaces, in particular shelf spaces for cargo used in warehouses and/or pick-up centers. The high cost and negative environmental impact of present cargo logistics systems is also a concern, in particular because of the widespread one-way use of carton boxes and other packing materials. Further, present cargo logistics systems logistics are not optimized for end-to-end deliveries so that customer satisfaction is limited.

International patent application publication WO/17/176450 discloses a collapsible and lightweight container for containing packaged items. The container may include a number of panels. Each panel may be made of a flexible, soft, and/or lightweight material. The panels may be arranged to form boundaries of an interior volume of the container and to transition between a collapsed state and an expanded state.

UK patent application GB 2445144 A discloses a collapsible basket with a fabric body, a base rack and a snap/in frame, hook and loop fastener. The basket may further comprise a base board placed flat on the bottom of the base rack when the basket is in use.

An object underlying the present disclosure is to provide efficient, customer-friendly and, in particular, scalable cargo logistics devices, methods and systems thereof.

SUMMARY

In an aspect of the disclosure, a cargo receptacle is provided, comprising a mount and a flexible member expandable and collapsible in height. The flexible member comprises a first end interconnected to the mount, wherein the flexible member in an at least partially expanded state bounds a storage volume for holding the cargo. The cargo receptacle also comprises an external access to the cargo. The mount is self-supporting and comprises a rim, in particular a flange or rim structure, suitable for mounting the cargo receptacle on a system of tracks spaced-apart laterally. The term lateral is used with respect to the height of the cargo receptacle and includes a direction perpendicular to the height direction of the cargo receptacle. The mount is self-supporting to the extent that it can support its own weight and that of the flexible member attached to it without loss of structural integrity.

Advantageously, cardboard boxes or parcels can be replaced by the cargo receptacle for holding cargo, said receptacle being suitable for easy loading onto a system of tracks for transport, for example a system of tracks in a sorting center or in a cart. Because the flexible member is expandable and collapsible in height, the same cargo receptacle can be used to hold differently sized cargo.

In a variation, the frame of the mount has a polygonal outline, in particular a rectangular outline and the rim is arranged at least at two sides of the frame which are preferably opposite each other. The mount, in particular the frame, may for example contain at least one material out of the group: plastic, hard plastic, steel, stainless steel, aluminum.

In a variation, the mount includes a base plate for supporting the cargo. The volume for accommodating the cargo is in this case bounded by the flexible member and the rigid planar surface.

In a variation, the mount includes a tray with a base plate, a side wall surrounding the base plate at least partially, and a rim, in particular a flange or rim structure, extending laterally away from the side wall. The side wall and rim extending laterally therefrom are elements of the frame of the mount. The base plate and the surrounding side wall encompass a cavity of the tray. The flexible member may be fixed at its first end preferably along the sidewall, the base plate of the tray or the rim. Preferably, the flexible member may be collapsed into the tray, in particular its cavity. Further, the flexible member may be expanded vertically beyond the limit of the side wall of the tray away from the rim.

The flexible member may contain or consist of at least one flexible material selected out of the group: textile, natural textile, natural textile containing animal-based fibers, natural textile containing plant-based fibers, canvas, synthetic textile, Kevlar, nylon, ballistic nylon, polyester, rubber, silicone rubber and/or any recycled material thereof.

In a variation, at least one mechanical buffer is arranged on the inside of the flexible member for buffeting the cargo against external forces. The mechanical buffer may comprise at least one cushion, such as a plastic air-cushion or a soft tube, fixed to the inside of the flexible member or integrated with the latter. The mechanical buffer may, for example, be fixed to the inside of the flexible member by fixing means such as seams from sewing, Velcro strip or adhesive.

In a variation, the cargo receptacle comprises at least one adjustable fastener attached to the mount and to the flexible member for setting and fixing the height of the flexible member and contents of the cargo receptacle. The adjustable fastener may include at least one element out of the group: a strap that can be tightened and loosened, a Velcro strap, a lace, a roll-down mechanism such as one as used in a roller shade, a spanning element for spanning out the flexible member.

The external access may include at least one element selected out of the group including a sealable opening, at least one sealable flap, in particular a hard plastic flap, a door, at least one zipper, at least one button, at least one button press stud or hook. The hard plastic flap or door may comprise a damper for delicate closure of the cargo receptacle.

Preferably, the external access to the cargo is arranged near the first end, in particular at or near the front face of the cargo receptacle having a surface normal essentially parallel to the height direction of the cargo receptacle. Alternatively or in addition, the external access is arranged along a side of cargo receptacle, having a surface normal at an angle or perpendicular to the height direction of the cargo receptacle. The side of the cargo receptacle may be a side of the mount or a side of the flexible member. In yet another embodiment, the external access extends across at least a part of the front surface and across at least a part of the side surface.

In a variation, the flexible member in its at least partially expanded state hangs from the mount and comprises a closed end opposite the first end, in particular in the manner of a bag. Where the mount includes a tray, the flexible member preferably hangs from a fixing point along the side wall, from the base plate or from the rim.

In a variation, the frame of the mount comprises an additional rim extending underneath the rim with which the cargo receptacle is mounted on the system of tracks. Both rims are designed to engage the tracks as a female counterpart to a male counterpart. The flexible member may be fixed to the additional rim and may comprise a greater width than the lateral spacing between the tracks on which the cargo receptacle is to be mounted.

In a variation, the flexible member comprises a collapsible and expandable skirt with an outer diameter less than or equal to that of the mount. The skirt may be raised or lowered by any of the described adjustable fasteners.

Preferably, the cargo receptacle comprises an ID-tag. The ID-tag, such as an RFID-tag, NFC tag or other electronic tag, is preferably arranged on the exterior of a side surface, more preferably on the exterior of a front side surface of the cargo receptacle, for example the exterior of a side surface of the flexible member or of the mount. Preferably, the ID-tag is encoded, in particular optically encoded with information relating to the size and/or content of the cargo receptacle, the fill status of the cargo receptacle as vacant, partially vacant or full, and/or relating to the delivery status of the cargo contained in the receptacle such as whether or not it is a return-delivery.

In a variation, an optical indicator is arranged on the cargo receptacle to indicate its fill status as vacant, partially vacant or full, and/or whether or not the cargo contained therein is a return-delivery. The optical indicator may comprise an LED or array of LEDs emitting a color that depends on the status of the cargo receptacle.

Alternatively, instead of an ID-tag, the cargo receptacle comprises, in the positions already noted, space, in particular a writing surface for printing or writing an address or shipment information or an electronic tag with e-reader technology, allowing the provision of address information or special delivery instructions to delivery personnel on demand.

The cargo receptacle is in particular suitable for carrying cargo of size less than l (length)=55 cm, w (width)=35 cm, h (height)=40 cm; although larger sizes may be suitable. In particular, the cargo may be pre-packaged, such as a cellular phone packed in the original packaging of the manufacturer.

In an aspect of the disclosure, a cargo receptacle is provided, comprising a mount, a flexible member and an external access to the cargo as described in this document, further comprising a cargo volume adjustment mechanism configured to increase and decrease the interior volume of the cargo receptacle. Generally, the cargo volume adjustment mechanism comprises a first end interconnected to the mount, for example to a side wall of the mount's tray, where one is provided. In a variation, the cargo volume adjustment mechanism is removably interconnected to the mount. Preferably, the cargo volume adjustment mechanism is extendible and collapsible in height.

In a variation, the cargo receptacle comprises a secondary frame and the cargo volume adjustment mechanism comprises a second end interconnected to the secondary frame. Good results are achieved when the secondary frame and the mount are interconnected in a mutually displaceable manner, preferably in a vertically displaceable manner.

In a variation of the cargo receptacle, the cargo volume adjustment mechanism comprises a spanning element, wherein the spanning element comprises at least one scissor-lift which may comprise a first end interconnected to the mount. However, the spanning element may generally include a pivot mechanism and/or a length extender.

Preferably, the spanning element comprises a second end interconnected to the secondary frame, such that the mount and the secondary frame are interconnected via the spanning element.

In a variation of the cargo receptacle, the mount comprises a pair of slide channels, the at least one scissor-lift comprising a first anchoring element configured to slide in the slide channel. Further, the first anchoring element may comprise a pre-tensioning element configured to be pre-tensioned against the mount and the scissor-lift so as to fix the first anchoring element in one position. In a variation, the first anchoring element may comprise a release actuator configured to allow the first anchoring element to be slid to another position.

In a variation, when the cargo receptacle is in a collapsed state, the scissor-lift is fully retracted into the mount and, where a secondary frame is provided, into the secondary frame. In both the collapsed state and the extended state, the first end of the scissor-lift is preferably integrated or contained in the mount and where a secondary frame is provided, the second end of the scissor-lift is preferably integrated or contained in the secondary frame.

In a variation, the secondary frame serves as an auxiliary mount of the cargo receptacle, is self-supporting and suitable for mounting the cargo receptacle on a surface, rack or system of laterally spaced-apart tracks. To this end, the secondary frame may comprise a rim, in particular a flange or rim structure extending outwardly from the frame.

In a variation of the cargo receptacle, the flexible member is removably attached to the mount. The flexible member may be, for example, a removable bag. In a variation, the flexible member is attached to the secondary frame at a second end. The flexible member may also be removably attached to the secondary frame at its second end.

In a variation, the secondary frame comprises a lid configured to open and close external access to the cargo of the receptacle. For example, the lid comprises a lid frame with a lid surface tensioned in and spanning the inner diameter of the lid frame.

In a variation, the contour and/or outline of the secondary frame corresponds to that of the mount, in particular to its base plate and/or the tray, where these are provided. Preferably, in a collapsed state of the cargo volume adjustment mechanism, the mount and the secondary frame are configured to rest on top of one another. In this state, the mount and the secondary frame are preferably essentially devoid of overlap, in the vertical direction on their respective inside, in order to maximize the volume available to accommodate cargo in the interior of the cargo receptacle.

Alternatively, the flexible member of the cargo receptacle comprises flaps interconnected to the mount, in particular to its base plate or side wall, the flaps being configured to be opened out over the top of the cargo receptacle and to provide a material screen against the cargo volume adjustment mechanism. Preferably, the flaps are interconnectable, for example via hooks, ties, or a zipper, to close the flexible member and seal the cargo contents of the receptacle.

In a variation, the cargo receptacle comprises at least one adapter frame removably attached to the exterior of the mount or the secondary frame. The adapter frame is configured to enable the cargo receptacle to be mounted on a variety of surfaces, for example on track pairs with varying lateral spacing.

In a variation, the cargo receptacle comprises a docking element configured to dock, in particular attach itself to, another cargo receptacle. The docking element may comprise a walled recess or projection. The docking element preferably is arranged on the exterior of the respective cargo receptacle's mount and/or the exterior of its secondary frame. The docking element or docking elements are configured to allow pulling out of a plurality of inter-docked cargo receptacles arranged adjacent each other in a cargo receptacle storage unit or cargo receptacle cart. The magnetic docking elements may comprise magnets, in particular permanent magnets arranged in walled recesses or on protrusions of the mount or secondary frame. As permanent magnets, neodymium magnets may be used.

In a variation, the cargo receptacle comprises a plurality of cargo volume adjustment mechanisms as described, arranged one on top of the other, wherein the second from the bottom and further cargo volume adjustment mechanisms in the stack are configured to be interconnected, in particular latched onto, to the respective lower cargo volume adjustment mechanism In a variation, at least one intermediate extender frame is provided configured to be interconnected to a cargo receptacle's mount or secondary frame. In a variation, a plurality of intermediate extender frames are provided in an extender frame assembly, whereby at least one cargo volume adjustment mechanism is arranged between two intermediate extender frames of at least one extender frame assembly.

In a variation, the intermediate extender frames are configured to be interconnected to a respective lower cargo volume adjustment mechanism in a stack. The intermediate extender frames may be each be constituted by a frame corresponding to the secondary frame as described in this document, the secondary frame preferably lacking the optional lid. The secondary frame and/or the intermediate extender frames may comprise a vertical lip, a plurality of vertical protrusions or lugs and/or recesses configured to engage the respective neighboring cargo volume adjustment mechanism, neighboring secondary frame or intermediate extender frame, in particular to engage a complementary structure such as a projection or recess of the respective neighboring cargo volume adjustment mechanism, neighboring secondary frame or intermediate extender frame.

In a variation, the topmost cargo volume adjustment mechanism is interconnected at its second end with a secondary frame, preferably comprising a lid as described in this document, and interconnected with its first end to a lower cargo volume adjustment mechanism, for example via an intermediate extender frame.

In a variation of the cargo receptacle, it comprises a strap or band attached to the mount, in particular to a side wall of the mount, configured to be harnessed by a person of the holder of a vehicle or transfer station. Preferably, the strap surrounds the mount circumferentially. In a variation, the strap is configured to be partially disengaged from the mount with at least two points of interconnection to the mount remaining, such that the strap can be used as a carrying strap. Where the mount comprises a tray, the external strap is preferably attached to a side or corner of the tray.

In a variation of the cargo receptacle, it comprises an indicator configured to indicate the state of extension of cargo receptacle, in particular of its at least one cargo volume adjustment mechanism. The indicator may be mechanical or electronic and operatively connected to the at least one cargo volume adjustment mechanism.

In an aspect of the disclosure, a cargo receptacle cart is provided, comprising a polyhedron frame comprising at least one access face for insertion and removal of at least one cargo receptacle as described in this document. The cargo receptacle cart further comprises a system of tracks spaced apart laterally for carrying the at least one cargo receptacle by its mount, in particular by its rim, each track comprising a mounting surface or seat extending laterally between the access face and an opposite face of the frame. The mounting surface is preferably flat with a surface normal parallel to the height direction of the cargo receptacle. For example, the polyhedron frame comprises pillars at each corner and the tracks extend between two corner pillars along a face of the frame adjacent an access face. Preferably, the cargo receptacle cart comprises an array of track pairs arranged on different height levels of the cart, the track pairs preferably being arranged equidistant from one another in height direction. Instead of pillars, the cargo receptacle cart may comprise solid external surfaces of sheets constituting the faces of a polyhedron, in particular metallic sheets, interconnected at vertices. Instead of metallic sheets, plastic, aluminum or steel sheets or sheets comprising layers of these or other materials may be used.

Advantageously, cargo receptacles can be flexibly inserted in the next free space of a cargo receptacle cart to optimize use of storage space, allowing for significantly higher storage density and less required storage space. In addition, every cargo receptacle is accessible in the cargo receptacle cart, in some variation following an unlocking procedure, and stacking of cargo receptacles can be avoided.

The cargo receptacle cart comprises means for locomotion, such as wheels, the means of locomotion being interconnected to the frame for moving the cart.

In a variation, the cargo receptacle cart comprises an ID-tag, which, in connection with a handheld reader or a reader mounted on a handling machine, allows the identification of the cargo receptacle cart and its load through a logistics management system configured to manage loading, storage, sorting and picking of the cargo receptacle cart. In a variation, an electronic or printed label may be fixed to the cargo receptacle cart.

In a variation, the cargo receptacle cart comprises an optical indicator configured to indicate which cargo receptacle carried by the cargo receptacle cart shall be removed from the cargo receptacle cart and which shall remain in the cargo receptacle cart. For example, the optical indicator comprises a light strip arranged on the cargo receptacle cart next to the access face of the cargo receptacle cart, for example along a pillar or near the edge of a metallic sheet. The light strip is configured to illuminate a light adjacent a cargo receptacle and indicates with a respective color, such as green or red, whether or not the cargo receptacle shall be moved by service personnel and/or the vehicle. The light strip may be arranged in vertical orientation. The light of the light strip may comprise at least one LED. The light strip may be operated according to instructions from the tracking system.

In an aspect of the disclosure, a cargo storage unit is provided comprising the features of the cargo receptacle cart as described in this document, wherein the means for locomotion, such as wheels, are optional.

In an aspect of the disclosure, use of a cargo receptacle cart as described in this document or a method for using this cargo receptacle cart is provided, whereby at least one cargo receptacle as described in this document is guided into the cargo receptacle cart and the cart is placed in a position for holding, transferring or for delivery of the cargo. To that end, the cargo receptacle cart may remain at the position where it received the cargo receptacle and is filled with further cargo receptacles. When it is filled with a certain number of cargo receptacles, it may remain where it is for temporary storage or be moved to another position, preferably by means of a vehicle as described in this document.

Further, the cargo receptacle cart may be held in a storage area of a warehouse, in particular an automated warehouse. In particular, the cargo receptacle cart may be held in a high bay storage, a multi-level high bay storage, an automatic high bay storage, a high bay racking storage and in particular an automatic high bay racking storage and any combination of these.

In a variation of the use, the at least one cargo receptacle is removed from the cargo receptacle cart for transfer to another cargo receptacle cart as described in this document or for sorting and/or handing over to its final destination, for example to a post box.

In a variation of the cargo receptacle cart, it comprises at least one sensor or detector for detecting any or all of its own position, the position of the at least one cargo receptacle supported on its tracks, and/or the size of the at least one cargo receptacle supported on its tracks.

In a variation, the cargo receptacle cart comprises a lock designed to block insertion and removal, in a closed position, of the at least one cargo receptacle into and out of the cargo receptacle cart, in particular via its access face. For example, the lock comprises a hinged locking bar extending vertically along the frame of the cart and attached thereto, the locking bar partially covering the access face of the cart when moved into a locking position.

In a variation, the hinged lock comprises a locking door configured to block access to essentially the entire access face.

In a variation, some of tracks are retractable into the frame. This may be useful to increase the space, in particular the lateral space available for the flexible member of a cargo receptacle mounted in the cargo receptacle cart.

A cargo receptacle cart in which cargo receptacles are mounted as described in this document has the advantage that together they can serve as a cargo hold and as a means for cargo transport. As a cargo hold, they can be moved, and as a cargo transport means, they may be parked at least temporarily. Hence, cargo need not be additionally packaged (beyond the original packaging provided by the manufacturer or packaging firm of the product) for transport purposes, thereby eliminating the need for complicated conveyor and packaging systems. Because the cargo receptacle cart as a cargo hold is mobile, it may easily be rearranged within a dispatch, transfer or sorting area, thereby providing an advantage over fixed cargo holds at depots. Given each cargo receptacle is accessible in a cargo receptacle cart at any time, the loading and unloading of parcel stacks and complex conveyor systems and belt sorting machines can be replaced by faster, more efficient and flexible sorting technology, saving capital, energy and reducing packaging waste.

In an aspect of the disclosure, a vehicle for moving a cargo receptacle cart as described in this document is provided, comprising: a drive for moving the vehicle, a holder for holding the cargo receptacle cart, and an electronic circuit configured to control the drive and the holder.

In a variation, the drive comprises means of locomotion, in particular wheels, for moving the vehicle across the ground or along a track.

In a variation, the holder is configured to attach itself to, hold and release the cargo receptacle cart and the electronic circuit is configured to control the holder accordingly. Preferably, the holder is configured to lift and/or grasp and/or latch onto the cargo receptacle cart.

The electronic circuit of the vehicle may comprise a communications interface configured to receive instructions from a warehouse management, transport and/or tracking system set up in the environment of the vehicle as described in this document in particular relating to a cargo logistics system and method. Further, the electronic circuit may be configured to send drive status information and holder status information, via the communications interface, to the tracking system. The communications interface may be a wireless communications interface.

In a variation, the electronic circuit of the vehicle comprises sensors configured to detect positions of cargo receptacle carts. Further, the electronic circuit of the vehicle may comprise sensors configured to detect positions and preferably sizes of cargo receptacles, in particular cargo receptacles contained in cargo receptacle carts.

In a variation, the vehicle comprises a transfer device configured to move one or more cargo receptacles into a cargo receptacle cart and to remove it therefrom, wherein the electronic circuit is configured to control the transfer device accordingly. The transfer device may comprise at least one lifting device which may be rotatable, a push-pull mechanism and/or at least one robotic arm.

In a variation, a computer program is mounted or installed on the electronic circuit of the vehicle, the computer program being configured to control the drive and the holder of the vehicle. In particular, the computer program is configured to operate the drive and the holder based on information received from sensors of the vehicle and/or based on instructions received from the warehouse management, loading/unloading, sorting or tracking system via the communications interface, the instruction being based on, for example, a sorting plan determining which cargo receptacles have to be moved and/or the route of the cargo receptacle cart.

In an aspect of the disclosure, a cargo logistics method is provided, whereby cargo is placed into at least one cargo receptacle as described in this document, at least one cargo receptacle cart as described in this document is provided, the at least one cargo receptacle is placed into the cargo receptacle cart. Preferably, a plurality of cargo pieces is placed into a plurality of cargo receptacles that have different destinations.

In a variation of the cargo logistics method, the cargo is transported to the at least one cargo receptacle by a vehicle, in particular an autonomous or semi-autonomous vehicle. The vehicle may, but does not have to be, a vehicle comprising the drive and holder as described in this document. For example, the cargo may be transported to the cargo receptacle in a movable rack carried by the vehicle. The cargo may then be placed into the at least one cargo receptacle cart, for example by means of a robot. The cargo logistics method may be implemented, for example, at a fulfillment center of an e-commerce firm, a mail order firm or a logistics or sorting center in general.

In another aspect of the disclosure, a cargo logistics method is provided, whereby at least one first cargo receptacle cart with features according to a cargo receptacle cart described in this document is provided and whereby at least one cargo receptacle as described in this document is carried by the at least one first cargo receptacle cart. Further, at least one second cargo receptacle cart with features according to a cargo receptacle cart described in this document is provided, whereby the at least one first cargo receptacle cart is moved next to the at least one second cargo receptacle cart. The at least one cargo receptacle is then transferred from the at least one first cargo receptacle cart to the at least one second cargo receptacle cart. For example, the cargo logistics method may be implemented at a fulfillment center, sorting center or logistics facility comprising a sorting area or cross-dock area.

Preferably, a plurality of cargo receptacles as described in this document is provided, the plurality of cargo receptacles being transferred from the at least one first cargo receptacle cart onto the at least one second cargo receptacle cart. Further, the plurality of cargo receptacles may be transferred from the at least one first cargo receptacle cart into different second cargo receptacle carts.

The plurality of cargo receptacles may be carried by different pairs of tracks of the at least one cargo receptacle.

In particular, a plurality of second cargo receptacles are preferably provided, whereby a plurality of cargo receptacles are transferred from the at least one first cargo receptacle cart into different second cargo receptacle carts.

Further, a plurality of first cargo receptacle carts may be provided, and a plurality of cargo receptacles transferred from the plurality of first cargo receptacle carts into different second cargo receptacle carts.

In a variation of the method, a transport vehicle such as a truck, car, bike or autonomous delivery vehicle such as a drone carries the at least one cargo receptacle cart, in particular the at least one first or second cargo receptacle cart, from a shipment node to a commercial sorting center or from the commercial sorting center to the shipment node. The shipment node may be an origin of shipment, a fulfillment center, a commercial sorting center and/or a warehouse, or a final shipment destination.

In a variation of the method, the at least one cargo receptacle cart is temporarily stored on a shelf or level of a multi-storied or high bay holding area. In a variation, multi-storied or high bay storage areas, in particular racks comprised in the same, are equipped with special tracks to directly carry the cargo receptacles described in this document.

In an aspect of the disclosure, a cargo logistics system is provided, comprising at least one cargo receptacle as described in this document, at least one cargo receptacle cart as described in this document, and at least one vehicle as described in this document, each of these being coordinated with respect to the other for carrying out a cargo logistics method as described in this document, preferably by means of a warehouse management, loading/unloading and/or a tracking system.

A cargo receptacle, cargo receptacle cart, a vehicle and/or a cargo logistics method and system as described in this document advantageously permit transport and sorting of cargo without multiple loading and unloading of parcels onto conveyors. Flexible delivery of cargo is facilitated without rigid delivery cycles and times (e.g. overnight via courier and parcel delivery in the morning or afternoon/ evening), customers can choose the speed of the delivery, in particular via direct routing. Cargo can be consolidated and flexibly rescheduled. Cargo returns are simplified without complicated processes for the customer, such as finding the right size cardboard box, adding packing and cushioning material, sealing, labelling, ordering the courier, arranging for a pick-up window or bringing the cargo to the courier station, or parcel box or locker. Cargo returns may simply be returned in the described cargo receptacle with delivery personnel. Cargo can be handled quickly but with care, it need not be transported long distances of rugged conveyor transport and sorting machines. Use of fixed equipment installations is minimized, since the cargo can be transported, transferred and stored using the cargo receptacle and cargo receptacle cart. As a result, the logistics are much more cost efficient, having 30-60% lower investment and operating costs. Further, new logistics services are made viable by leveraging the circulation of the cargo receptacles towards a sustainable circular economy.

Advantageously, the cargo receptacles and the carts which carry them can be stored and transported as needed in a space-saving manner, whereas traditional systems with fixed storage shelves lack flexibility and space efficiency, in particular with varying shipment sizes. Because the sorting of cargo is done directly from a receptacle cart to another by means of vehicles, no separate conveyor or sorter-grid based sorting equipment is required. Cargo can remain in cargo receptacles from start to destination, or be sorted between cargo receptacle carts, and can thus be handled with maximum care.

Preferably, the cargo receptacle, the cargo receptacle cart and/or the vehicle, comprise ID-tags or optical status indicators.

In a variation, the cargo logistics system comprises a tracking system with an electronic circuit, the tracking system being configured to track the cargo receptacle, the cargo receptacle cart and/or the vehicle based on detecting their identification tags and/or optical indicators. The electronic circuit comprises a data memory, at least one processor, communications interface for communication with cargo receptacles, cargo receptacle carts and/or vehicles, a user interface for use by an operator, and a communications network linking these. The electronic circuit may also comprise sensors for detecting position, size and/or status information of the cargo receptacle, the cargo receptacle cart and/or the vehicle. The tracking system is preferably installed in a warehouse, sorting area, and/or transfer area of a mail-order firm or logistics center. Preferably, a computer program is mounted on the electronic circuit for controlling the tracking system.

The tracking system of the cargo logistics system may be configured to maintain an inventory and localize cargo receptacles, cargo receptacle carts and/or vehicles based on RFID, NFC, BLE (Bluetooth Low Energy), mobile tracking technology or other localization technique. Identification of cargo receptacles, cargo receptacle carts and/or vehicles may be done through a specific identification number logic detectable on the respective cargo receptacle, cargo receptacle cart or vehicle, for example via an ID-tag or visual indicator, or the identification may be carried out based on information transmitted via an RFID chip, NFC tags or other electronic device on the respective object. The identification number logic may include information or link to the information stored in a warehouse management or transport system, such as the cargo item, size, and capacity of the cargo receptacle cart.

In a variation, the tracking system is configured to track the shipment status of each cargo receptacle. For example, the tracking system is configured to detect an optical indicator on each cargo receptacle. For example, ready for delivery cargo receptacles indicate this status with a green light, cargo receptacles intended for return are indicated with a red light, cargo receptacles containing second deliveries are indicated with an orange light, and cargo receptacles containing new cargo are indicated with a yellow light. The lights may be arranged on the respective cargo receptacle and include LEDs. The lights may be arranged as a numeral indicating a specific handling or delivery order. In addition or alternatively, the tracking system is configured to track the status of the cargo receptacle via computer screens, handheld devices and/or e-readers.

In a variation of the cargo logistics system, the at least one vehicle comprises a communications interface for transmitting status information, such as position, occupancy and/or vacancy of cargo receptacle slots in cargo receptacle carts, to the tracking system and receiving instructions from the tracking system, such as route information, cargo receptacle loading and/or unloading instructions.

In a variation, the cargo logistics system additionally comprises a packing station including an arrangement of at least one packing surface such as a table or system of track pairs for mounting a cargo receptacle with a hanging flexible member, a plurality of cargo receptacles, at least one transfer station, and a plurality of cargo receptacle carts. In a variation, the packing station comprises a lifting device for lifting and lowering the packing surfaces.

Preferably, the packing station includes a picking machine, in particular a picking robot, although service personnel may be employed instead. At least one of the cargo receptacle carts preferably carries an empty cargo receptacle. The transfer station is configured to retrieve a packed cargo receptacle from the packing surface. The picking robot, where provided, is configured to pick cargo from a cargo storage nearby and place it in the cargo receptacle which the transfer station has extracted from a standby cargo receptacle cart and placed on the packing surface. Although the transfer station is typically fixed, a vehicle for moving cargo receptacle carts as described in this document may be used in its place. As in the case of the vehicle, the packing station preferably comprises an electronic circuit including a communications interface for communicating with the tracking system of the cargo logistics system, in particular receiving operation instructions therefrom. The electronic circuit of the packing station preferably also includes sensors for detecting position, size and/or fill-status of cargo receptacles. As in the case of the vehicle, a computer program is preferably mounted on the electronic circuit for operating or operating a part of the packing station such as the transfer device and the packing surfaces.

At the packing station, two or more cargo receptacle carts are preferably arranged within reach of the transfer station. One of the cargo receptacle carts receives packed cargo receptacles, packed, for example, by the picking robot, while the at least one other cargo receptacle cart is on standby to provide the transfer station and packing robot with empty cargo receptacles where needed.

The cargo logistics system, in particular its tracking system, may further be configured to allocate the appropriate cargo receptacle size to a shipment. For packing, for example, the tracking system may be configured to determine which cargo receptacle is best suited for the cargo to be packed and which cargo receptacles are already full, for example in the case of second deliveries or already packed new deliveries, and which cargo receptacles in the cart are free for packing.

Further, the cargo logistics system may determine the appropriate size cargo receptacle for packing (for example ranging from 3.5 to 40 cm or more in several receptacle sizes) based on order data from the order fulfilment/ERP System, so the appropriate cargo receptacle cart can be brought to the packing station, for example by a vehicle, and so that the appropriate cargo receptacle can be placed at the packing station or the vehicle can transfer the appropriate cargo receptacle to the packing table of the packing station.

The cargo logistics system, in particular its tracking system, may further be configured to determine the appropriate height for the packing surface at the packing station. To help achieve adequate ergonomics for service personnel or the appropriate height for a picking robot, the cargo logistics system determines the optimal height of the adjustable packing table. The height is defined based on the height of service personnel or a picking robot along with the expected cargo or cargo receptacle height, for example based on order management information stored in the tracking system, in particular its electronic circuit.

Further, the cargo logistics system, in particular its tracking system, may determine the appropriate storage position for a cargo receptacle in a cargo receptacle cart. At the end of the packing process, for example, the cargo logistics system may be configured to determine in which storage position or on which level of the cargo receptacle cart the new cargo receptacle can be placed to optimize use of space in the cargo receptacle cart. This determination may be done by the system based on exact measures of the cargo receptacle, whereby the tracking system is configured to measure, by an automated optical, laser or other technology measuring device connected to the packing surface, the size of the cargo receptacle. The determination may also be derived from account inventory information on occupied/vacant storage positions in the cart.

Further, the cargo logistics system, in particular its tracking system, may be configured to assign destinations to cargo receptacle carts based on shipment data and historical data analyzed by Artificial Intelligence (AI). For example, the tracking system may be configured to determine which cargo receptacle carts are destined for what destination, such as a unique delivery address, another distribution or sorting center, or a city depot. The cargo receptacle cart's destinations may be determined based on current order data (expected volume per destination) and historical shipment data analyzed with AI.

Further, the tracking system of the cargo logistics system may be configured to manage the transfer of cargo receptacles to cargo receptacle carts by means of the vehicles. Based on the cargo receptacles stored in first cargo receptacle carts, the tracking system may be configured to determine the transfer of each cargo receptacle to a second cargo receptacle cart and storage level therein (level of pair of tracks). Based on this information, the vehicles receive instructions on routes and stops throughout the sorting or transfer area. At each stop, for example, the tracking system may be configured to determine which cargo receptacle shall be moved by a vehicle from a first cargo receptacle cart and where it shall be placed in a second cargo receptacle cart. Based on this determination, the vehicles receive instructions on the routes to follow. For speed and simplification, however, the routes of the vehicles may alternatively be determined by other electronic devices and algorithms, for example by vision-based navigation and swarm logic making use of sensors of the vehicle's electronic circuit, where provided.

The cargo logistics system has the advantage in that it allows for dynamic transfer and sorting of cargo. On the fly, the cargo logistics system may assign cargo receptacle carts to destinations and cargo receptacles to cargo receptacle carts and may at any time change assignments and rearrange cargo receptacles.

Given the re-useability of the cargo receptacles and provided the availability of dynamic information on cargo, cargo receptacles, sizes, loads and localization thereof, the cargo logistics system is also configured to consolidate and coordinate cargo logistics by selecting, moving, and, in particular, bringing together cargo receptacles at predefined locations.

In a variation, the cargo logistics systems comprises a transport management system configured to select shipment methods based on a dynamic database of available delivery routes, delivery route capacity, current and historical shipment data, each of which may be determined by AI or from external data sources. The transport management system may be a part of the tracking system or it may be separate and interconnected to the tracking system. Using the dynamic data, the transport management system is configured to determine an optimal shipping method for cargo, such as last mile delivery or indirect routing via additional sorting centers or city depots. Participating in the determined optimal shipping method, the vehicles are for example configured to receive instructions from the tracking system to move occupied cargo receptacle carts ready for shipment to a loading area and load them onto appropriate transport vehicles used in long haul FTL, short haul LTL, courier, express, and/or private transport, said transport vehicles including autonomous vehicles such as drones, trucks, bikes, cars, aircraft and ships.

The cargo logistics system also has the advantage that it can be configured to perform last minute changes or transport optimizations. For example, in case of deviations between expected and real volumes per destination or last minute changes of customers, the cargo logistics system, in particular its tracking system, may be configured to instruct the vehicle or vehicles to pick, rearrange, or single out cargo receptacles from cargo receptacle carts having a destination for direct or express shipment routed separately. Another advantage is that individual shipments can be moved out or into a cargo receptacle cart or cargo storage unit without unloading and loading of the whole cargo receptacle cart or cargo storage unit.

In a variation, the cargo logistics system, in particular its tracking system is configured to determine the timing and sequence of cargo deliveries, wherein exact shipment information and storage location of cargo receptacles and cargo receptacle carts on the transport vehicles are available to the tracking system, in particular the transport management system. Based thereon, the tracking system is configured to determine what cargo shall be delivered, how, and when. Compared to today's last mile delivery systems, where drivers manually sort cargo into delivery trucks, it is possible to save a lot of time and labor. Localizing cargo receptacles and cargo receptacle carts, the cargo logistics system can automatically update shipment status of each shipment.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE DRAWINGS

The present disclosure will be more fully understood from the detailed description given herein below and the accompanying drawings which should not be considered limiting to the disclosure described in the appended claims, wherein:

DETAILED DESCRIPTION

Reference will now be made in detail to certain embodiments, examples of which are illustrated in the accompanying drawings, in which some, but not all features are shown. Indeed, embodiments disclosed herein may be embodied in many different forms and should not be understood as limited to the embodiments set forth herein; rather, these embodiments are provided so that this disclosure will satisfy applicable legal requirements. Whenever possible, like reference numbers will be used to refer to like components or parts.

Figure 1:
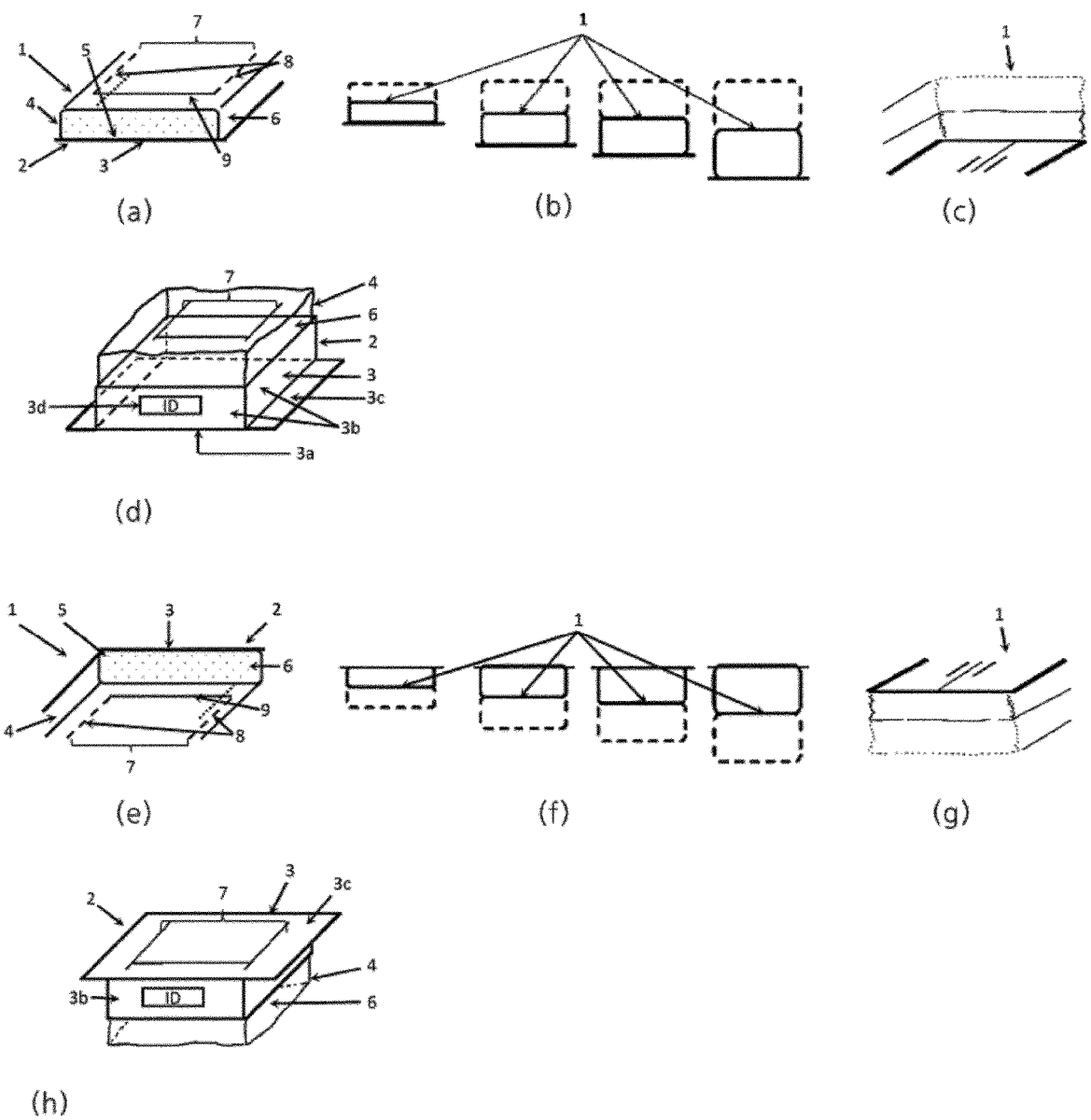
FIG. 1 shows cargo receptacles including different stages of expansion.

FIG. 1a shows a re-usable cargo receptacle 1 comprising a self-supporting mount 2 for mounting on a system of laterally spaced apart tracks, the tracks being suitable for carrying the cargo receptacle 1 between two transport positions. The mount 2 includes a ring-shaped frame 3 having a preferably rectangular outline. The mount 2 further includes a cargo support surface, in particular a base plate extending between the external limits of the frame 3. The frame 3 and preferably the cargo support surface are rigid and preferably consist of steel, hard plastic or a combined material containing a hard plastic and high pressure cast aluminium. A flexible member 4 is fixed with its first end 5 to the mount 2, in particular to the frame 3, and bounds a storage volume for cargo. The flexible member 4 can be a vertically extendible bag fixed to the mount 2, in particular the frame 3. The flexible member 4 shown here is in its first expansion state in which the skirt 6 extends vertically away from the frame 3 by one level. In its ground state, however, the flexible member 4 may lie folded or collapsed across the mount 2.

At its first end 5, the skirt 6 comprises fixing means such as a series of loops wrapped around the frame 3. The loops may be closed by buckles. The flexible member 4 preferably comprises a textile, in particular a textile resistant to wear and tear, such as canvas or a textile such as a ballistic nylon, in particular for high-value cargo. Instead of being carried out as a bag, the flexible member may be realized as a flexible box.

FIG. 1*a* also shows the cargo receptacle 1 to comprise an external access 7 at an end opposite the first end 5. The external access 7 comprises a zipper system wherein two zipper lines 8 are arranged along the sides of the cargo receptacle 1, the zippers being connected to each other by a bar 9. As the bar 9 is pulled along the zipper lines 8, for example by an automatic opening mechanism or by service personnel, access to the interior of the cargo receptacle 1 is gained. A cord may be fixed to the bar 9, or, in the absence of a bar 9, directly to the zipper lines 8 in such a way that pulling on the cord allows external access to the interior of the cargo receptacle 1. Alternatively, the external access 7 comprises flap doors, for example consisting of a hard plastic. In addition, or alternatively, the external access 7 can be arranged along the surface of the skirt 6 of the flexible member 4 having a surface normal perpendicular to the collapse/expansion (vertical direction of the cargo receptacle 1. This enables external access to the cargo receptacle 1 from the side. Instead of the zipper system, the external access 7 may comprise one or more Velcro fasteners or hooks.

An identification tag may be fixed to the mount 2 (see in particular FIG. 1*d*) identifying the destination and preferably contents of the cargo receptacle 1 optically and/or electronically to service personnel and/or to a machine, in particular to a robot with optical and/or electronic sensing means. For example, the identification tag may be a QR code, a barcode, or an RFID tag.

At least one mechanical buffer may be arranged on the inside of the flexible member 4 or the mount 2 in the form of a cushion, in particular a plastic air multi-use cushion or a plurality of tubes fixed to the inside of the skirt 6 or mount 2 by fixing means such as seams, Velcro strips, adhesive. The cushion may also be integrated with the flexible member 4. The cushion protects fragile and/or valuable cargo against breakage against mechanical impulses. The cushions can be filled with air by means of appropriately arranged and connected valve connectors. When the cushions are filled with air, they would not only protect from bumps, but also fix the goods securely inside the bag in particular if there are a plurality of cargo items with different dimensions inside the cargo receptacle 1. In particular, the cargo support surface of the mount 2 may be lined with a cushion material such as rubber.

The cargo receptacle 1 may comprise compacting means such as straps, buckles, Velcro or ties attached to the mount 2 and to the flexible member 4, whereby each of these elements may be tightened to force the flexible member 4 into a small volume.

Typically, the end of the flexible member 4 opposite the mount 2 is grasped and pulled for expanding it. To facilitate expansion of the flexible member 4, it may comprise a spanning element configured to span the flexible member 4 to the desired expansion state or level. The spanning element may comprise a system of pre-tensioned elements, such as springs, releasable from a locked state by an actuator such as a button or dial. The pre-tensioned elements are configured to be returned to their compacted and preferably locked state by pressing down on them or pressing down on the flexible member 4 as a whole. The pre-tensioned elements may be interconnected by a rigid member following the contour of the flexible member 4, such as an additional ring-shaped frame 3. Preferably, the spanning element is arranged on the inside of the flexible member 4, in particular adjacent to the inner side of the skirt 6. Alternatively, the spanning element may comprise a snap-in rod or rods arranged along the side of the skirt 6 which snap into position and engage the additional ring-shaped frame 3 as the skirt 6 is unfolded. For collapsing the skirt 6, the rods may be pushed aside and the additional frame pushed toward the mount 2.

FIG. 1*b* shows cargo receptacles 1 with different sizes, each expandable by a factor of 2 in height. Starting from the left, the first cargo receptacle has a height of 3.5 cm expandable to 7 cm, the second cargo receptacle a height of 10.5 cm expandable to 21 cm, the third cargo receptacle a height of 14 cm expandable to 28 cm and the rightmost cargo receptacle a height of 17.5 cm expandable to 35 cm. Other sizes and expandable height factors are possible depending on a customer's needs. Preferably, the cargo receptacle 1 has the following maximum dimensions: l (length)=55 cm, w (width)=35 cm, h (height)=40 cm. Preferably, the cargo receptacle 1 is sufficiently robust to repeatedly carry cargo with a weight not exceeding 25 kg.

FIG. 1*c* is a perspective view of the cargo receptacle 1 shown in FIG. 1*a*, cargo receptacle 1 however being expanded to a second level.

FIG. 1*d* shows a cargo receptacle 1 comprising a mount 2, which includes a tray 3 comprising a base plate 3*a* from which side walls 3*b* extend vertically and from which a rim, in particular flange or rim structure 3*c* extends laterally. The flange or rim structure 3*c* is suitable for mounting the cargo receptacle 1 on a system of spaced apart tracks. A flexible member 4 is fixed at its first end 5 to the mount 2, preferably along multiple points of the sidewalls 3*b* and/or of the base plate 3*b*. In its ground state, the flexible member 4 is collapsed into the interior of the tray 3. In the first state of expansion to a first level, the flexible member 4, extends vertically beyond the upper edge of the tray 3 away from the flange or rim structure 3*c*. As previously presented, the flexible member 4 may include an external access 7 and spanning elements. In addition, as previously presented, an identification tag 3*d* may be fixed to the tray 3, in particular to the exterior of the sidewall or sidewalls 3*b*.

FIG. 1*e* shows a cargo receptacle 1 with the design that is essentially a mirror image of the cargo receptacle 1 shown in FIG. 1*a*. The cargo receptacle 1 comprises a mount 2 as previously described. Extending between the limits of the ring-shaped frame 3 however is an external access 7 to the interior of the cargo receptacle 1 instead of the rigid cargo support structure previously described. Hence, the flexible member 4 comprises features as previously described with an exception of the external access 7, which in the present embodiment is arranged at the first end 5 of the flexible member 4 next to the mount 2 instead of at the closed end facing away from the mount 2. The flexible member 4 is interconnected to the mount 2 so as to hang from the mount 2 when the latter is placed on the system spaced apart tracks. As in the previous examples, the external access 7 may alternatively be arranged along the inside surface of the flexible member 4, in particular along its skirt 6.

FIG. 1*f* shows cargo receptacles 1 according to FIG. 1*e* with different sizes and states of expansion analogous to those shown in FIG. 1*b*. Similarly, FIG. 1*g* is a perspective view of the cargo receptacle 1 shown in FIG. 1*e*, cargo receptacle 1 however being expanded to a second level. FIG. 1*h* is a perspective view of the cargo receptacle 1 as shown in the previous drawings 1e to 1f and comprising the tray 3 according to FIG. 1d, the tray 3 according to the present figure however being inverted and comprising an external access 7 instead of a base plate 3a.

Figure 2:
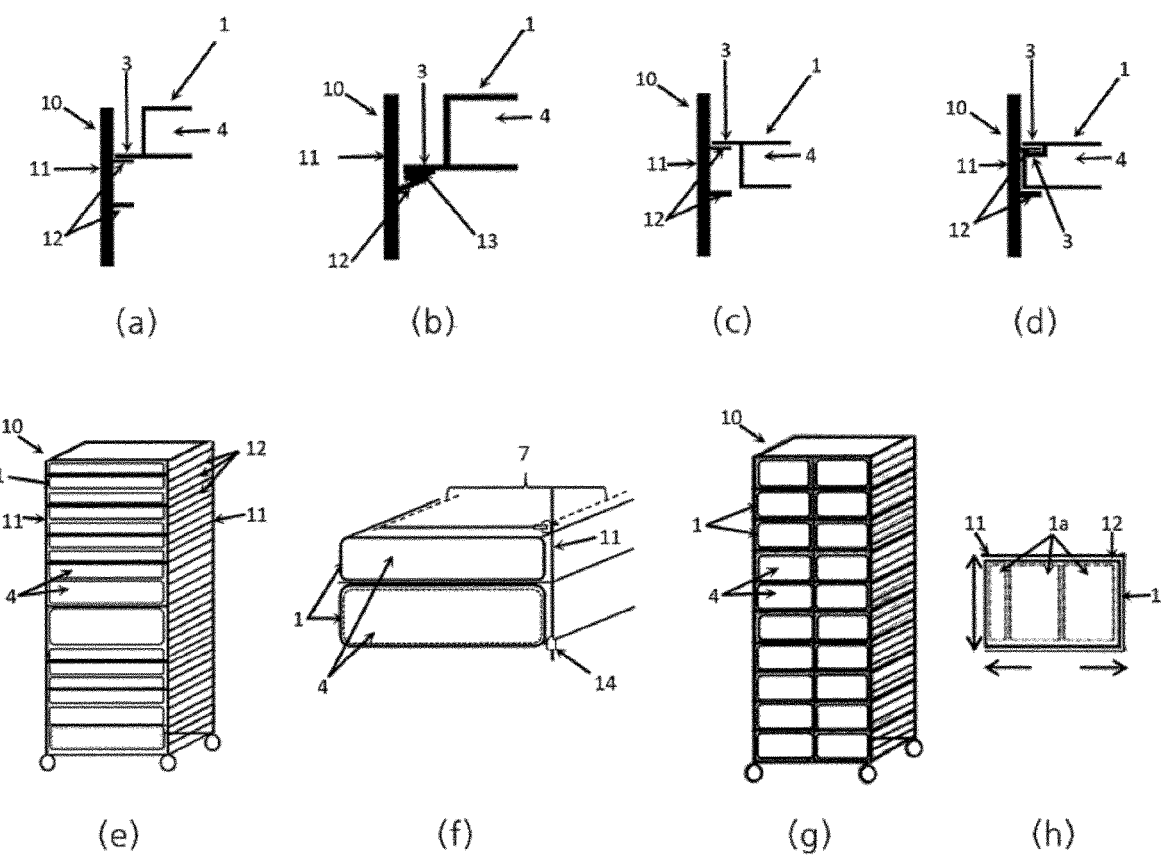
FIG. 2 shows different cargo receptacle carts containing a variety of cargo receptacles.

FIG. 2a shows a cross-section of the cargo receptacle 1 mounted on a pair of laterally spaced apart tracks 12. These tracks 12 are, for example, arranged on the insides of a cargo receptacle cart 10 as additionally shown in the following figures. The frame 3 is shown to comprise a section, in particular a rim, extending laterally beyond the lateral limit of the flexible member 4. The section of the mount 2 rests on a track 12, the mount 2 being sufficiently self-supporting to support the weight of the cargo contained in the cargo receptacle 1 without substantially compromising its structural integrity. As the flexible member 4 is expanded and its height increased, the cargo volume bounded by the flexible member 4 fits into the space between the spaced apart tracks 12. Because one type of cargo receptacle cart 10 and one type of cargo receptacle 1 having an adjustable height can be used for transporting variable amounts of cargo, particularly efficient sorting of cargo can be achieved with minimal usage of one-way packaging.

FIG. 2b shows a cross-section of the arrangement according to FIG. 1a with the difference that the tracks 12 on which the cargo receptacle 1 is placed are at an incline with respect to the vertical. In addition, the mount 2, in particular the ring-shaped frame 3 of the mount 2 comprises a beaded or raised section 13 on the surface of the frame 3 facing away from the flexible member 4. The raised section 13 engages the inclined track 12 in a manner reducing potential for lateral displacement or jiggling of the cargo receptacle 1.

In the manner of FIG. 2b, FIG. 2c shows a cross-section of the cargo receptacle 1 shown in FIGS. 1e to 1h mounted on a track 12, wherein the flexible member 4 hangs down beyond the level of said track and tracks further down if the flexible member 4 is expanded further.

FIG. 2d shows the cargo receptacle 1 in the manner of FIG. 2c, with the difference that the frame 3 of the mount 2 comprises an additional section extending underneath and parallel to the section or rim of the mount 2 resting on the track 12, the frame 3 of the mount thereby engaging the track 12 as a female counterpart to a male counterpart. The flexible member 4 is fixed to the additional section of the ring-shaped frame 3 underneath the track 12. The flexible member 4 has a greater width than the flexible member 4 presented in the previous figures. To account for expanded states of the flexible member 4 that increase its vertical dimension, additional tracks 12 arranged further below are designed to be retractable into the frame of the rack structure or cargo receptacle cart 10, thereby providing the necessary space for the flexible member 4 having the increased width. This arrangement also helps to reduce the ability of the flexible member to sway from side to side.

FIG. 2e is a perspective view of a cargo receptacle cart 10 comprising a vertical array of a laterally spaced apart pairs of tracks 12 on which a number of cargo receptacles 1 are mounted, in particular cargo receptacles 1 according to the following FIG. 2f, although any of the cargo receptacles 1 described in this document may be used. The cargo receptacle cart 10 comprises a generally polyhedron-shaped frame, in particular as a prism with a square or rectangular cross-section. The tracks 12 extend laterally along two sides of the frame that are opposite each other and connect corresponding corner pillars 11 of the frame, the two opposite sides being separated from one another by at least one additional side of the frame, the at least one additional side being suitable for insertion and removal of a cargo receptacle 1 into and from the cargo receptacle cart 10. This side is considered an access face of the cargo receptacle cart 10. In the perspective along the longitudinal axis of the tracks 12, they may at least partially comprise an L-shaped cross section, the long leg of the "L" being the mounting surface on which the mount 2 of a cargo receptacle 1 is mounted and the short leg of the "L" being the fixing surface for fixing the respective track 12 to the frame, in particular to the pillars of the cart 10. Additional pillars may be arranged between the two corner pillars 11 for supporting the tracks 12 along their length (along a side of the cart 10).

Wheels are provided at the bottom of the cart 10 to facilitate displacement across the ground or surface. The wheels may contain a material suitable for reducing transport vibrations and noise, such as a soft rubber. In addition, the wheels may comprise locks in order to immobilize the cargo receptacle cart 10 when transported by truck or other transport vehicle. Further, protectors may be arranged on the cargo receptacle cart 10 to reduce noise during transport, for example plastic or rubber on key areas of the of the cart 10 subject to the strongest acoustic resonances. The cargo receptacle cart 10 may also comprise a rounded outline or rounded extremities in order to be appropriately accommodated in airfreight containers. Preferably, the cargo receptacle cart 10 has the following dimensions: width=40 to 80 cm, depth=60 cm, height=60 to 270 cm, depth=60 cm. Preferably, neighboring levels of pairs of tracks 12 (with respect to the vertical) are arranged at a distance of 3.5 cm from one another. Preferably, the lowermost level of pairs of tracks 12 in the cargo receptacle cart 10 is at a distance of at least 15 to 20 cm from the ground or less, in case the wheels are removed.

The cargo receptacle cart 10 may comprise a locking bar (not shown) extending longitudinally along a side, in particular a supporting structure such as a corner pillar 11, said locking bar including pivot means such as a hinge interconnected to the corner pillar 11 of the cargo receptacle cart 10. When in a locking position, the locking bar projects into the access face of the cargo receptacle cart 10 for insertion or removal of a cargo receptacle 1, thereby preventing removal of cargo receptacles 1 contained in the cargo receptacle cart 10. Accordingly, when the locking bar is pivoted to an open position, the respective side of the cargo receptacle cart 10 is unblocked and cargo receptacles 1 can be inserted into and removed from the cargo receptacle cart 10. Further the cargo receptacle cart 10 may comprise sensors and measuring points to allow for automated storage or cargo receptacles 1.

FIG. 2f is a perspective view of a cargo receptacle 1 comprising two flexible members 4 sharing a common mount 2, wherein a first flexible member 4 is an upper flexible member and a second flexible member 4 is a lower, hanging flexible member. The upper flexible member 4 is interconnected to the common mount 2 in the manner described with references to FIGS. 1a to 1d and the lower flexible member 4 is interconnected to the common mount 2 in the manner described with references to FIGS. 1e to 1h. Any or both of said flexible members 4 may comprise a lock 14 to prevent opening of the respective external access 7. The lock 14 may be interconnected with a supporting structure 11 of the cargo receptacle cart 10 or interconnected to the system of pairs of spaced apart tracks 12. FIG. 2f also shows how such a lock 14 may be interconnected with a side external access 7 of the lower flexible member 4 while another lock 14 is interconnected with an external access 7 on the upper face of the upper flexible member 4. The side external accesses 7 may be arranged in the mount 2, in particular when it is carried out as a tray according to FIG.

1*d* or 1*h*, in which case the side external accesses 7 are arranged in the side walls of the respective tray. Alternatively, they may be arranged in the respective flexible member 4, in particular its skirt 6. Alternatively, or in addition, both the upper flexible member 4 and the lower flexible member 4 have side external accesses 7. Such a cargo receptacle 1 may be advantageously used for transporting clothing items, whereby the upper part of the cargo receptacle 1 bounded by the upper flexible member 4 may contain cleaned or dry cleaned clothing and the lower part of the cargo receptacle 1 bounded by the lower flexible member 4 may contain laundry for cleaning.

FIG. 2*g* is a perspective view of a cargo receptacle cart 1 comprising such components as those described with reference to FIG. 2*e*, wherein at least two cargo receptacles 1 are arranged side by side along pairs of spaced apart tracks 12 arranged at the same height level of the cargo receptacle cart 10. Bisecting the cargo receptacle cart 1 longitudinally are longitudinal support structures such as pillars required for arranging the additional tracks. In essence, the cargo receptacle cart 10 is a side-by-side and co-joined arrangement of two cargo receptacle carts 10 as described in this document.

FIG. 2*h* is a top view onto a cargo receptacle 1 as described in this document having dimensions suitable for accommodating standard sized postage packaging for cargo such as XS with l=22.5 cm, w=14.5 cm, h=3.5 cm; S with l=25 cm, w=17.1 cm, h=10 to 15 cm; M with l=35 cm, w=27.5 cm, h=5 to 20 cm; and L with l=45 cm, w=35 cm, h=20 cm; all sizes being approximate. The size of cargo 1*a* contained in the cargo receptacle 1 preferably is a factor of the size of the cargo receptacle 1.

Figure 3:
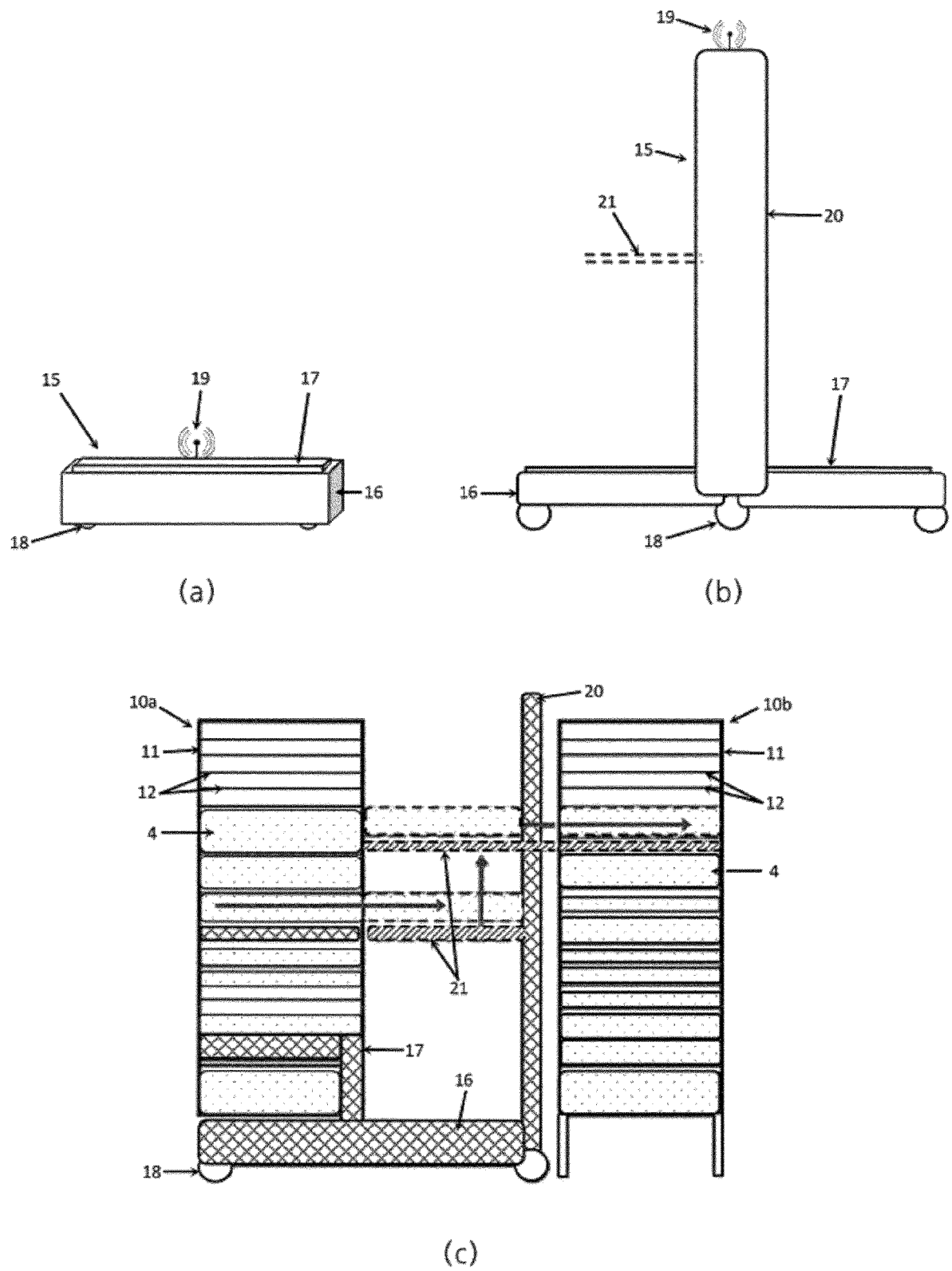
FIG. 3 shows vehicles suitable for moving a cargo receptacle cart and handling cargo receptacles.

FIG. 3*a* shows a vehicle 15 for moving a cargo receptacle cart 10 as described in this document. The vehicle 15 comprises a base member 16 in containing the drive of the vehicle 15, a holder in the form of a lifting member 17 for raising and lowering a cargo receptacle cart 10, a set of wheels 18, and a wireless control interface 19 of an electronic circuit. Although a lifting member 17 in particular a lifting platform or fork 17 is shown, any holder or holding device suitable for holding a cargo receptacle cart 10 may be used. The base member 16 contains an electronic circuit comprising an installed computer program for controlling the robot based on instructions received via the wireless interface 19 that is configured to receive control instructions from a tracking system of an electronic circuit of a cargo logistics system described in this document and to send drive status information and holder status information to the electronic circuit. In addition, the vehicle 15 may comprise a number of sensors in order for it to navigate between locations for picking up and leaving cargo receptacle carts 10. The computer program may comprise artificial intelligence (AI) functions and modules, based on, at least in part, machine learning. Essentially, the vehicle 15 may be considered an autonomous or semi-autonomous robot with means to hold, transport, and release a cargo receptacle cart 10.

Figure 4:
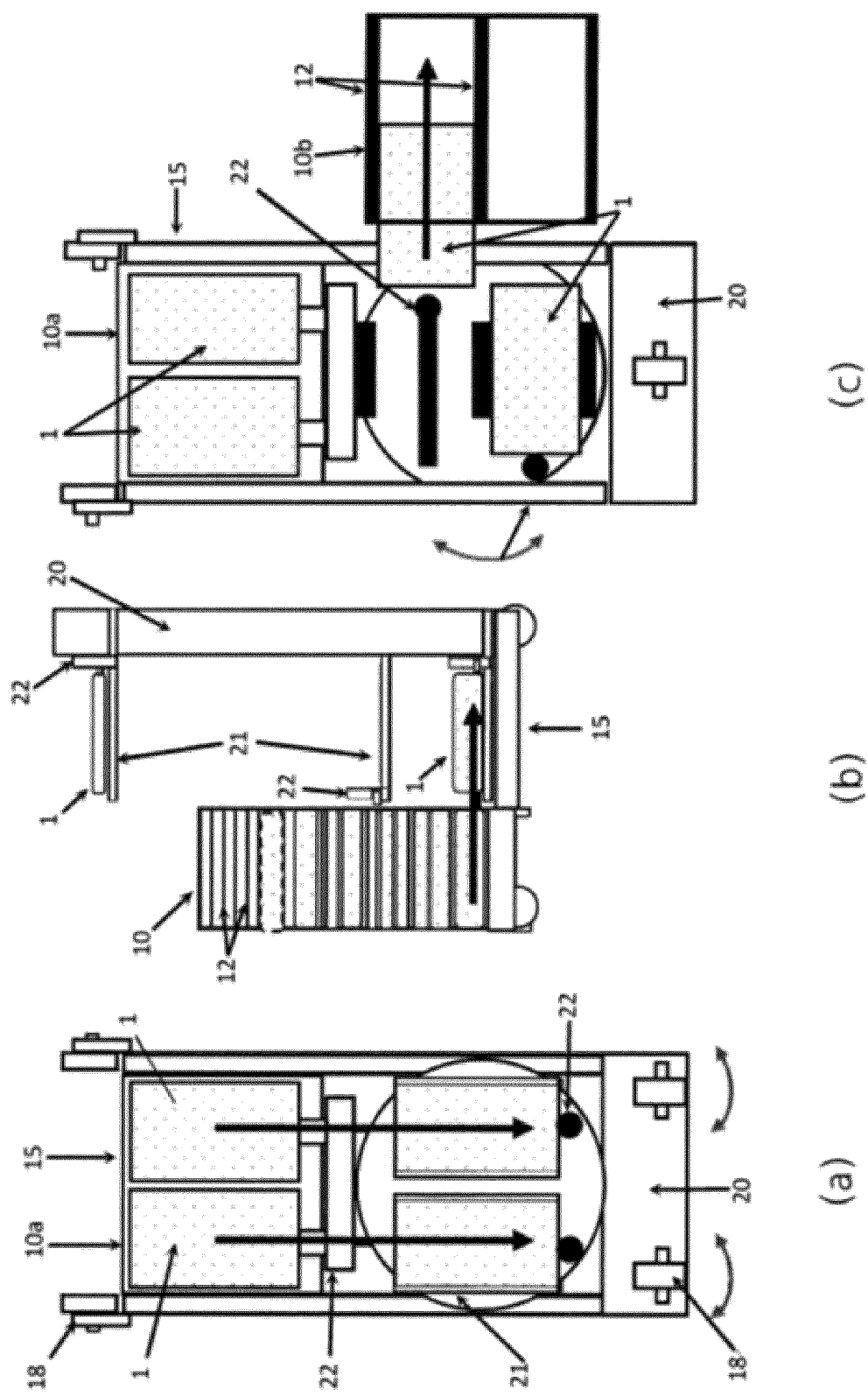
FIG. 4 shows another vehicle suitable for moving a cargo receptacle cart and handling cargo receptacles.

FIG. 3*b* shows a vehicle 15 comprising, in addition to such components as described with reference to FIG. 3*a*, a transfer device 20 comprising a lift and at least one lifting platform 21 suitable for removing a cargo receptacle 1 from a first cargo receptacle cart 10*a* (see FIG. 3*c*) on to the lifting platform 21 and then moving the cargo receptacle 1 into a second receptacle cart 10*b* (see FIG. 3*c*). The transfer device 20 is configured to lift and lower the at least one lifting platform 21 and also to laterally shift the respective lifting platform 21 from one side of the transfer device 20, in particular the lift, to the other. Alternatively, instead of being configured to laterally shift the respective lifting platform 21, the transfer device 20 of the vehicle 15 may be configured to rotate the respective lifting platform 21 in which case the lifting platform 21 may be considered a turntable (see also FIG. 4). The transfer device may also comprise push-pull devices, for example pistons, forks or grasping/holding arms, for transferring cargo receptacles 1 from a first cargo receptacle cart 10*a* to a second cargo receptacle cart 10*b* via the respective lifting platform 21. Although the vehicle 15 shows the transfer device 20 to be arranged approximately midway on a base body 16, other arrangements are possible, such as those shown in the following figures.

FIG. 3*c* shows the operation of the vehicle 15 as described with reference to FIG. 3*b*. The vehicle 15 drives to pick up first cargo receptacle cart 10*a* from a pickup position by means of a holder such as a lifting platform or fork 17. The lifting platform 17 shown in this drawing is at a distance from the base body 16 of the vehicle 15 to improve stability of the first cargo receptacle cart 10*a* while it is being picked up, transported and set down. The lifting platform or fork 17 is suitable to be inserted into a section of the first cargo receptacle cart 10*a* between pairs of tracks 12 on different levels of the cart 12. After pickup, the vehicle 15 drives to and stops at a transfer position next to a second cargo receptacle cart 10*b*. At the transfer position, the transfer device 20 of the vehicle 15, by means of suitable push-pull devices (see FIG. 4 for further detail on the push-pull devices), moves cargo receptacles 1 from the first cargo receptacle cart 10*a* and onto the lifting platform 21. The lifting platforms, in particular turntables 21, are raised and lowered to appropriate positions where the transfer device 20, by means of suitable push-pull devices, moves the cargo receptacles 1 into the appropriate available slots of the second cargo receptacle cart 10*b*. When this operation is completed, the vehicle 15 returns to a pickup position and the process is repeated according to a sorting plan. For example, the second cargo receptacle cart 10*b* is assigned a certain destination, such as an intermediate holding area, for example a local post office. Preferably, the vehicle 15 comprises sensors to detect the destination and content of cargo receptacles 1 according to their ID tags, if provided. The detected information is sent to the electronic circuit of the vehicle 15 based on which the driver of the vehicle 15 and the transfer device 20 are operated. Alternatively, the detected information is sent to the electronic circuit of a cargo logistics system as described in this document via the wireless control interface 19, whereupon, via the same or other wireless control interface, the vehicle 15 receives operation commands from a command unit of the cargo logistics system.

FIG. 4*a* is top view onto the vehicle 15 as described with reference to FIG. 3*c*. Two cargo receptacles 1 carried by a first cargo receptacle cart 10*a*, itself transported by the vehicle 15, or pulled or pushed onto a turntable 21 of the transfer device 20 by means of push-pull device 22. Push-pull device 22 preferably takes the form of a fork, which slides underneath the respective cargo receptacle 1, carries out a slight lifting operation and pulls the respective cargo receptacle 1 onto the turntable 21.

FIG. 4*b* is a side view onto the vehicle 15 shown in FIG. 4*a*. Multiple, in particular three, turntables 21 and their respective push-pull devices 22 of the transfer device 20 are shown for transferring multiple cargo receptacles 1, in particular six, receptacles 1 in parallel to a second cargo receptacle cart 10*b*.

FIG. 4*c* is a top view onto the vehicle 15 as shown in FIG. 4*a* in the states where the turntable has turned by 90° and the cargo receptacles 1 are pushed by means of push-pull devices 22 into the second cargo receptacle cart 10*b*, in particular onto the appropriate tracks 12 of said cart 10*b*.

Figure 5:
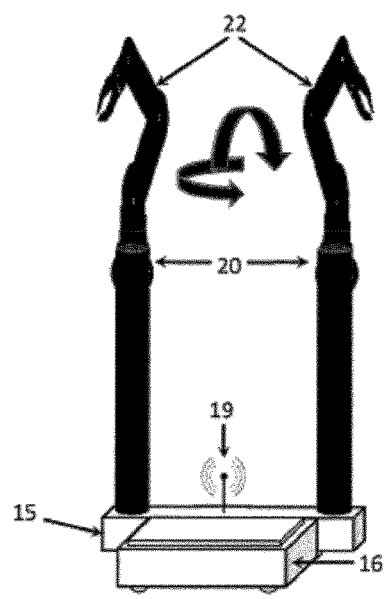
FIG. 5 shows another vehicle suitable for moving a cargo receptacle cart and handling cargo receptacles.
Figure 5:
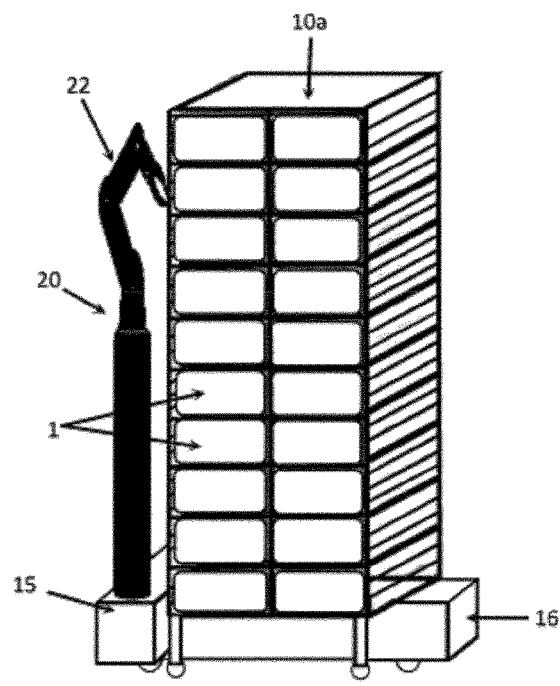

FIG. 5*a* shows vehicle 15 comprising a base body 16, a holder in the form of a lifting platform 17 and a wireless control interface 19 according to the basic configuration as described with reference to FIG. 3*a*, with a number of additional features. The base body 16 is T-shaped, wherein the ends of the T-bar each support a robotic arm 22 of a transfer device 20 configured to remove cargo receptacles 1 from a first cargo receptacle cart 10*a* and transfer them to a second cargo receptacle cart 10*b* according to a sorting plan. The robotic arms 22 of the transfer device 20 comprise grasping and holding devices at their ends to grasp and hold cargo receptacles 1 as instructed by the appropriate computer program and sorting plan installed on the electronic circuit. Where necessary, counterweights are located at appropriate positions in or on the base body 16 of the vehicle 15 to balance the weight of the robotic arms 22.

FIG. 5*b* shows the vehicle 15 according to FIG. 5*a* in operation, during which a first cargo receptacle cart 10*a* is being carried to a transfer position or has arrived at a transferring position where the cargo receptacles 1 can be transferred by means of the robotic arms 22 to the second cargo receptacle cart 10*b*.

Figure 6:
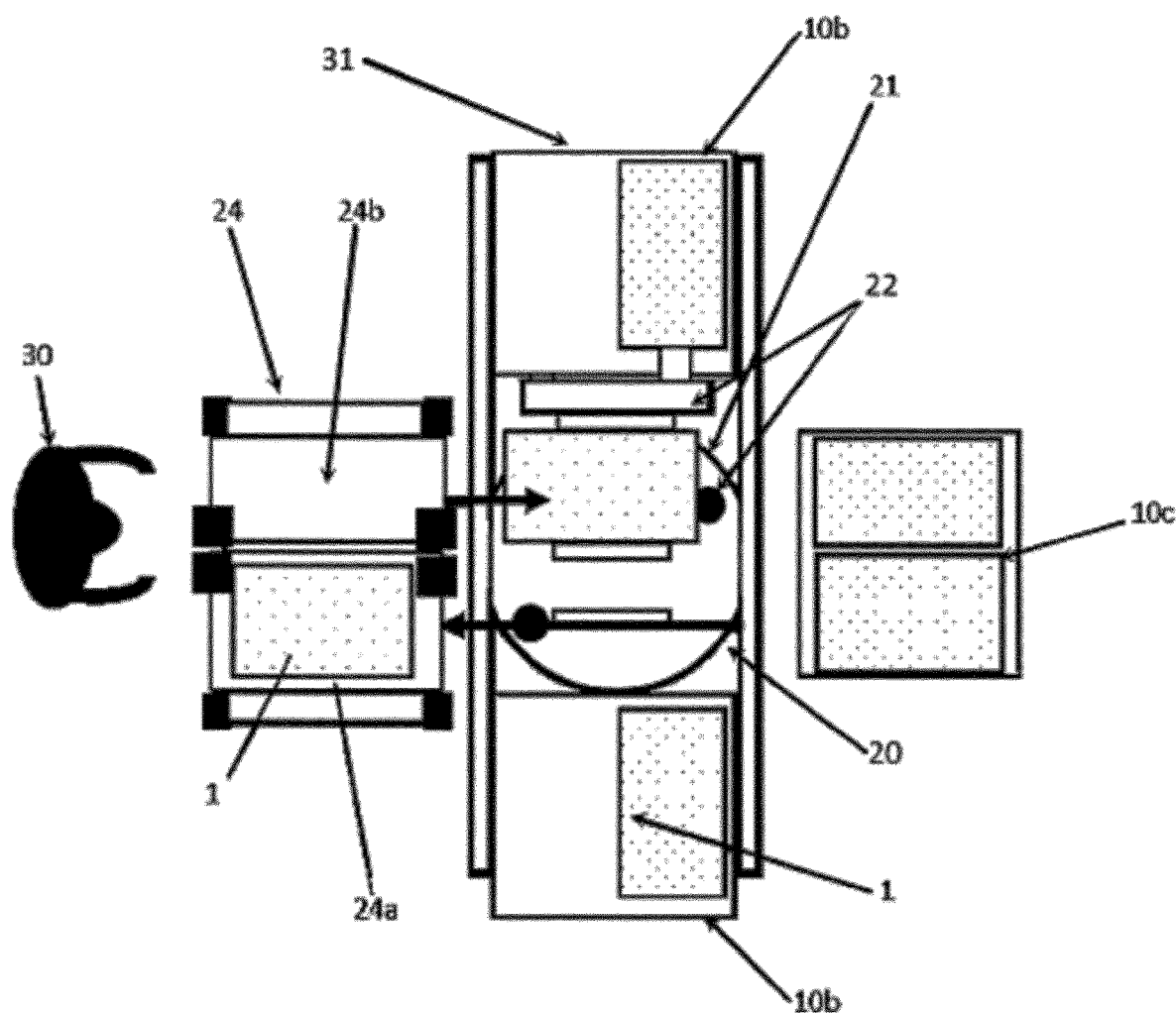
FIG. 6 shows a packing station.

The vehicle 15 according to FIGS. 3*b*, 3*c*, 4*a* to 4*c* and 5*a* and 5*b*, and described generally in this document comprising a transfer device 20, may be adapted to constitute a transfer station mounted to a support, such as a fixed support, for example the floor of a warehouse. An example of such a transfer station is shown in FIG. 6. The support may instead be mobile, such as a shuttle, configured to travel between positions also a cargo storage aisle, for example in a warehouse and/or high bay rack. The shuttle may be mounted on rails or tracks provided along the cargo storage aisle.

FIG. 6 shows an autonomous or semi-autonomous packing system, comprising a packing surface 24 carried out as a packing table provided at a packing station 31. The packing system may be employed at the origin of a delivery chain, such as in the warehouse of an online e-commerce or mail-order enterprise. The packing table 24 is divided into 2 parts, each part comprising a lift and a height measuring device. The first part 24*a* of the packing table 24 is configured to receive empty cargo receptacles 1 from the rotatable platform or turntable 21 of a transfer device 20 of the transfer station 31, which pulls the empty cargo receptacle 1 from a third cargo receptacle cart 10*c* containing different sizes of empty cargo receptacles 1. The turntable 21 may optionally be mounted on a lifting device and may therefore be lowered and raised. The picking robot 30 or service personnel packs the cargo for delivery into the cargo receptacle 1 provided by the third cargo receptacle cart 10*c*/by the turntable 21. The cargo to be packed can be arranged in boxes or shelves (not shown) within reach of the picking robot 30 or service personnel. In addition, a stock of differently sized cargo receptacles 1 can be arranged next to the picking robot 30 or service personnel and placed on the packing table 24 for packing. Once an appropriately sized cargo receptacle 1 has been packed, the transfer station 31 retrieves the packed cargo receptacle 1 and transfers it via the transfer device 20 comprising the rotating platform or turntable 21 to the onward cargo receptacle cart 10*b*. Alternatively, the transfer device 20 of the transfer station 31 may comprise at least one robotic arm for extracting empty cargo receptacles 1 contained in cargo receptacle cart 10*c* and placing them onto the packing surface 24, in particular the first part 24*a* of the packing surface. After the cargo receptacle 1 has been packed with cargo, the robotic arm transfers it to an onward cargo receptacle cart 10.

Allocation of a filled cargo receptacle 1 to the appropriate onward cargo receptacle cart 10*b* is preferably performed automatically by means of sensors connected to an electronic circuit with a transfer management program, the sensors being configured to read ID-tags provided on the cargo receptacles 1 and, optionally, on the onward cargo receptacle cart 10*b*. The sensors may be arranged at suitable positions on the transfer station 31. Optionally, as a transfer station 31, a vehicle 15 according to FIGS. 3 to 5 may be used.

Figure 7:
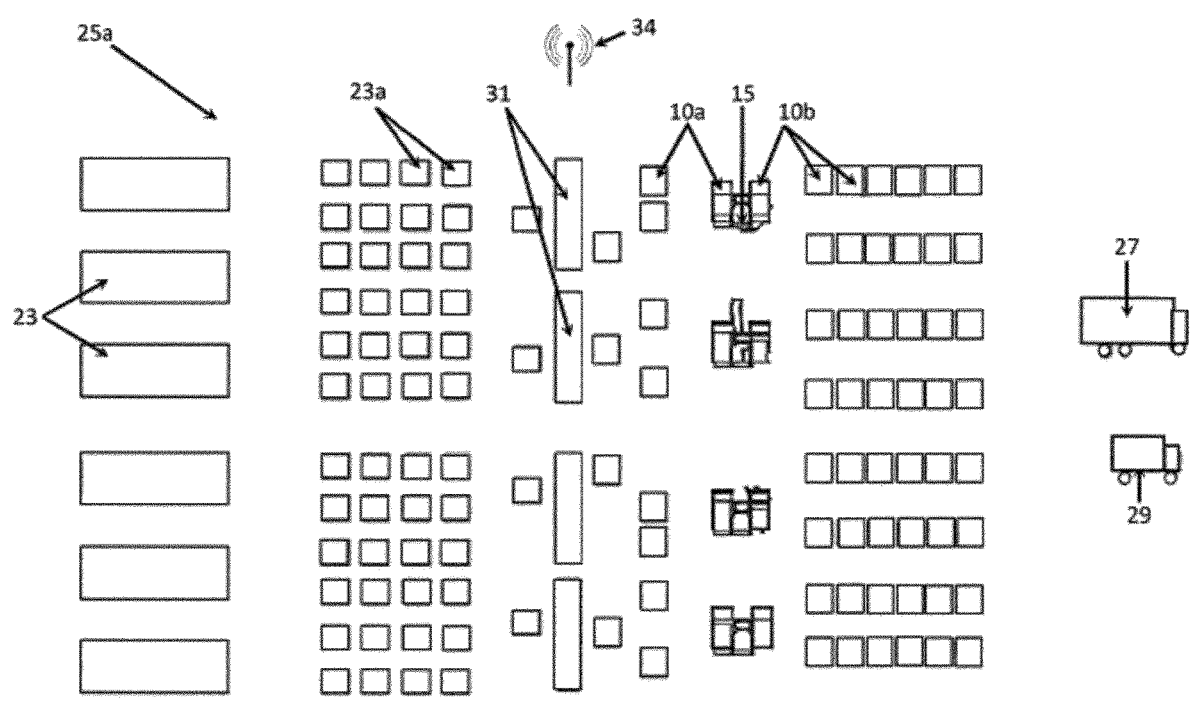
FIG. 7 shows a cargo logistics system and method.

FIG. 7 shows a cargo logistics system 25*a* as set up at a cargo dispatch area, for example in the depot of a mail-order firm or in the fulfillment center of an e-commerce enterprise. Cargo, such as cargo pre-packaged by the manufacturer of a product such as a cellular phone, is stored at first cargo hold 23 which serves as bulk storage. The cargo is transferred, in particular sorted, by service personnel or by a vehicle 15 such as one described in this document to a second cargo hold 23*a* with smaller containers according to destination, size, urgency etc. From the second cargo hold 23*a*, cargo is transferred to a packing station 31 such as one shown in FIG. 6, where it is transferred to a cargo receptacle 20*a*. The cargo receptacle cart 20*a* is brought either by service personnel or a vehicle 15 such as one described in this document to a second cargo receptacle cart 10*b*, to which the cargo is transferred in the manner described with reference to FIGS. 3 to 5. Alternatively, the vehicle 15 may move the second cargo receptacle cart 10*b* to the first cargo receptacle cart 10*a* as directed by, for example, a tracking system 34 set up in the area. Once the second cargo receptacle cart 10*b* is occupied, it is transferred by service personnel or by a vehicle 15 to a transport vehicle 27 or smaller transport vehicle 29 for its onward journey to a destination or intermediate destination, which may be a sorting center.

FIG. 8*a* shows a part of a cargo logistics system in a high bay mail dispatch or sorting area, typically at the depot of a mail order firm or larger sorting center. Racks 32 are provided with multiple levels or shelves 32*a*. Cargo receptacle carts 10*a* are arranged on the shelves and may be locked into position with wheel locks or parked into position-securing cargo receptacle bays. A vehicle 15 such as one described with reference to FIGS. 3 to 5, carrying a cargo receptacle cart 10*a* moves in the alley between the racks 32 and stops at a position where it picks up, by means of the transfer device 20 including such means as a rotatable platform 21, push-pull mechanism 22 or robotic arm, a cargo receptacle 1 from a cargo receptacle cart 10*a*. The reverse is also possible where the vehicle 15, carrying a cargo receptacle cart 10*b* at least partially loaded with cargo receptacles 1, stops by a cargo receptacle 10*a* on a shelf 32 and places the cargo receptacle 1 into designated or free slot or track pair of the cargo receptacle 10*a* on the shelf.

FIG. 8*b* is a top view of the vehicle 15 shown in FIG. 8*a*, in particular a cargo receptacle cart 10*b* carried by the vehicle and a transfer device 20 including a rotatable and liftable platform 21 and a push-pull mechanism 22 for passing the cargo receptacle 1 in and out of the vehicle 15.

Figure 9:
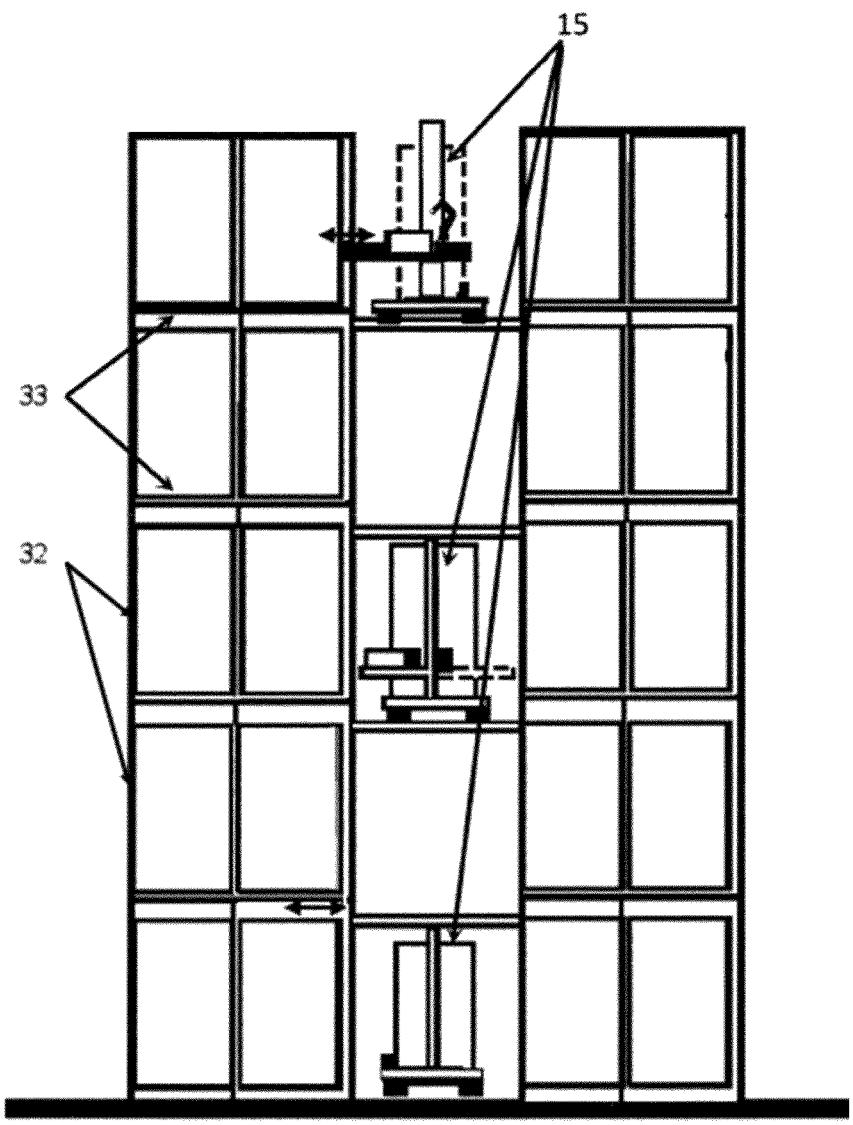
FIG. 9 shows a cargo logistics system and method including a second vehicle suitable for use in a high bay storage.

FIG. 9 shows a part of a cargo logistics system in another high bay mail dispatch or sorting area, typically at the depot of a mail order firm or larger sorting center. Cargo receptacle carts 10*a* are arranged on multiple floors 33 of multi-floored depot. On each floor 33, a high bay rack 32 may be provided as shown in the previous examples are possible consisting of one or more shelves. Travelling on each level 33 is a vehicle 15 performing operations as described in this document. On different floors, cargo receptacle carts 10a of particular content may be held. In particular, on the ground floor, the vehicle 15 delivers a cargo receptacle cart 10 filled with cargo receptacles 1 and places it on a shelf of a high bay rack 32. The vehicle 15 may also remove a cargo receptacle cart 10 from this floor. On the third (middle) floor, cargo receptacles 1 may be exchanged, via the transfer station or vehicle 15, between different cargo receptacle carts 10 which may include a cargo receptacle cart 10 carried by the vehicle and a cargo receptacle 1 carried parked on this floor. On the uppermost level, a transfer station or vehicle 15 is used that comprises a picking robot or picking device configured to place and remove cargo into/from a cargo receptacle cart 10 and/or a cargo receptacle 1, and place the cargo into an empty or partially filled cargo receptacle 1 carried by the vehicle 15. The picking robot or picking device may alternatively be provided separately from the vehicle 15 on the respective high bay level and is configured to place cargo onto a packing surface as shown with respect to FIG. 6, instead of or together with, service personnel. The cargo receptacle 1 to be filled with cargo may be provided in a cargo receptacle cart 10 carried by the vehicle 15 or it may be stored on the respective high bay level.

Figure 8:
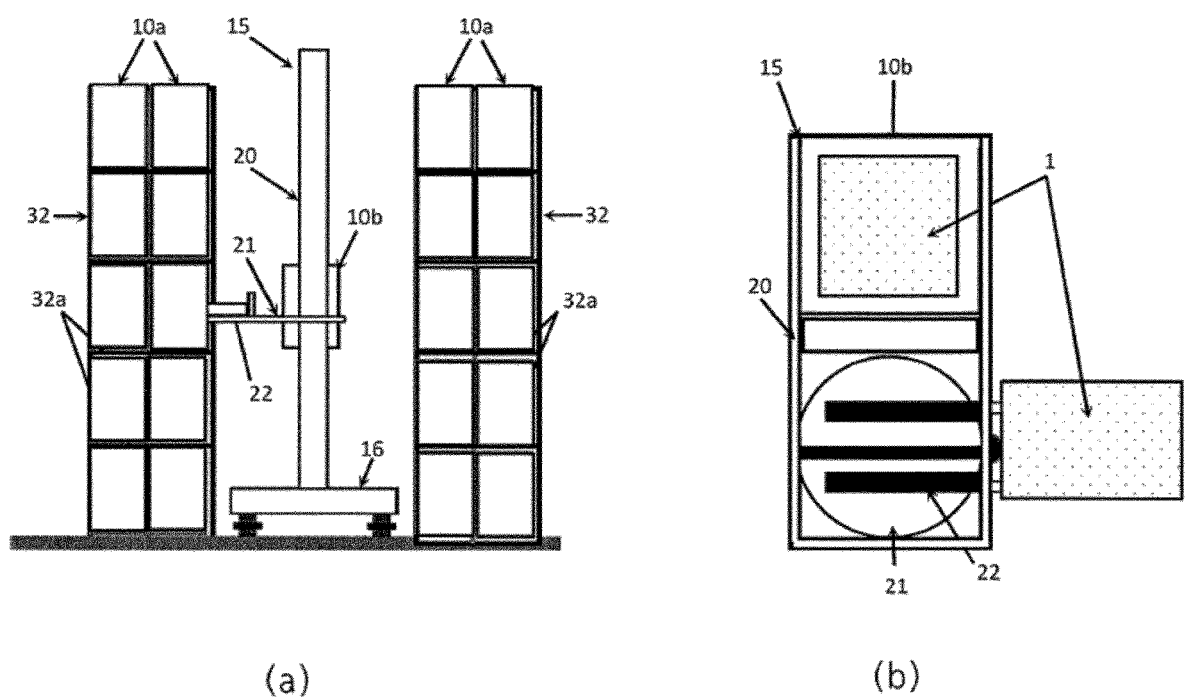
FIG. 8 shows a cargo logistics system and method including a first vehicle suitable for use in a high bay storage.

The cargo logistics systems according to FIGS. 8 and 9 advantageously enable a very high rate of cargo transfer and sorting in a limited space. In some variations, the high bay racks or storage racks in general of the cargo logistics system are equipped with tracks suitable to carry cargo receptacles 1 without a cargo receptacle cart 10. The cargo logistics system including the high bay and/or storage floor system advantageously permits picking operations in the storage aisles.

Figure 10:
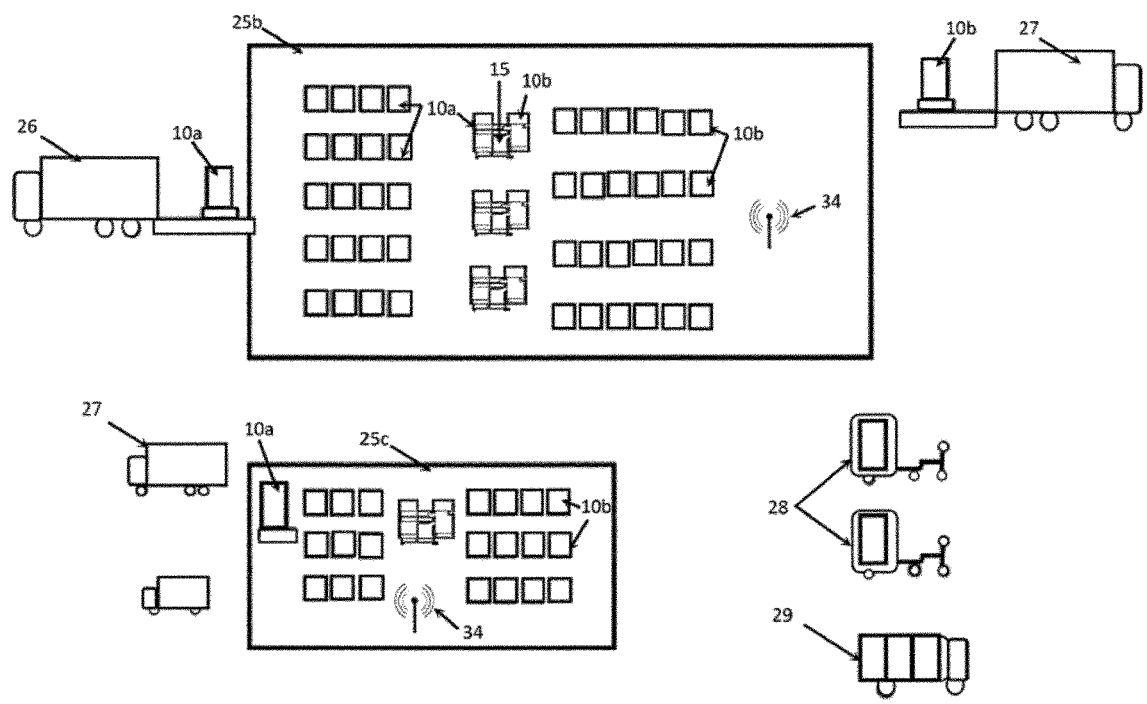
FIG. 10 shows a cargo logistics system at a transfer and/or sorting center.

FIG. 10 shows a cargo logistics system including the devices and components described in this document. At a first sorting center 25, a delivery vehicle 26 such as a truck arrives loaded with at least partially occupied cargo receptacle carts 10a, such as those that have been filled with cargo receptacles 1 at an origin, for example at a packing station of a mail-order enterprise according to FIG. 6. The cargo receptacle carts 10a are unloaded and moved to a holding area. This holding area may be one as described with reference to FIGS. 8 and 9 and cargo receptacles 10a may be placed into and removed from the holding area. This operation may be performed by a vehicle 15 and a tracking system 34 as described in this document. Alternatively, the vehicle 15 moves directly to an onward cargo receptacle cart 10b holding area and transfers the cargo receptacle 1 from the incoming cargo receptacle carts 10a to the appropriate onward cargo receptacle carts 10b according to their assigned destinations in the manner described with reference to FIGS. 3 to 5. The now at least partially filled onward cargo receptacle carts 10b are moved to an onward delivery vehicle 27 such as a truck. This truck arrives at a second sorting center 25a. The second sorting center 25a may be assigned a smaller delivery area or domain than the first sorting center 25. The cargo receptacles 1 are transferred to onward cargo receptacle carts 10b in the manner previously described. The latter are then transferred to smaller delivery vehicles, such as delivery bikes 28 or mid-to-small size delivery trucks or vans 29 which may deliver to the final destination such as a private or business residence.

Figure 11:
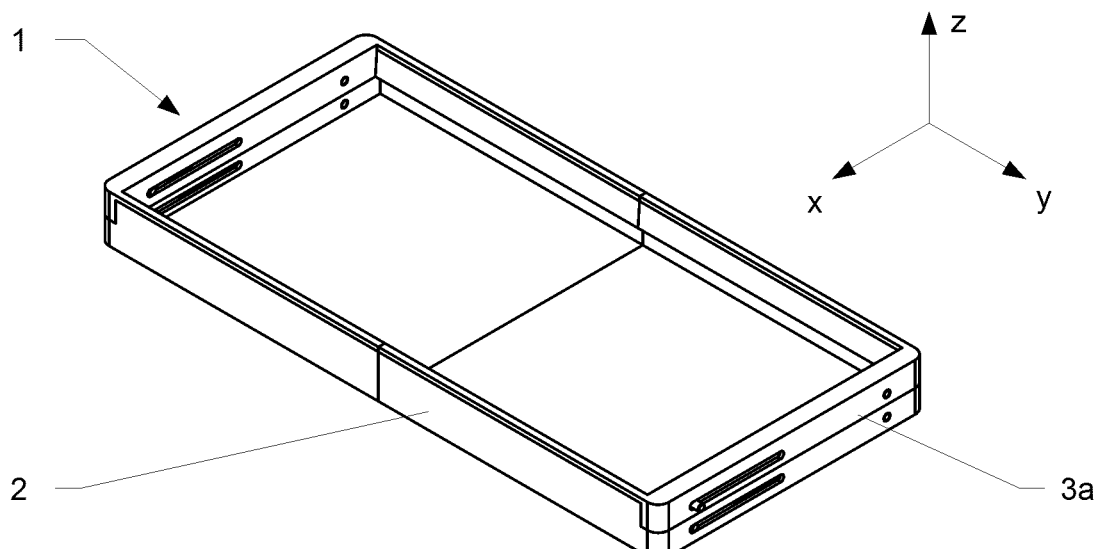
FIG. 11 shows a cargo receptacle in a collapsed state.

FIG. 11 shows a cargo receptacle 1 in the collapsed state of a cargo volume adjustment mechanism (shown in additional detail in FIG. 12), the cargo receptacle 1 comprising a mount 2 in the form of a rectangular tray. The cargo receptacle 1 further comprises a secondary frame 3a interconnected to the mount 2 by means of the cargo volume adjustment mechanism. In the collapsed state shown here, the secondary frame 3a rests on the mount 2. The outer lateral surfaces of the mount 2 and the second secondary frame 3a are essentially flush with each other. The secondary frame 3a may contain the same material as the mount 2, in particular, they may both be made of a hard plastic as their respective main material component providing them with self-supporting quality. The cargo receptacle 1 may serve both as a storage and re-useable shipping box.

Figure 12:
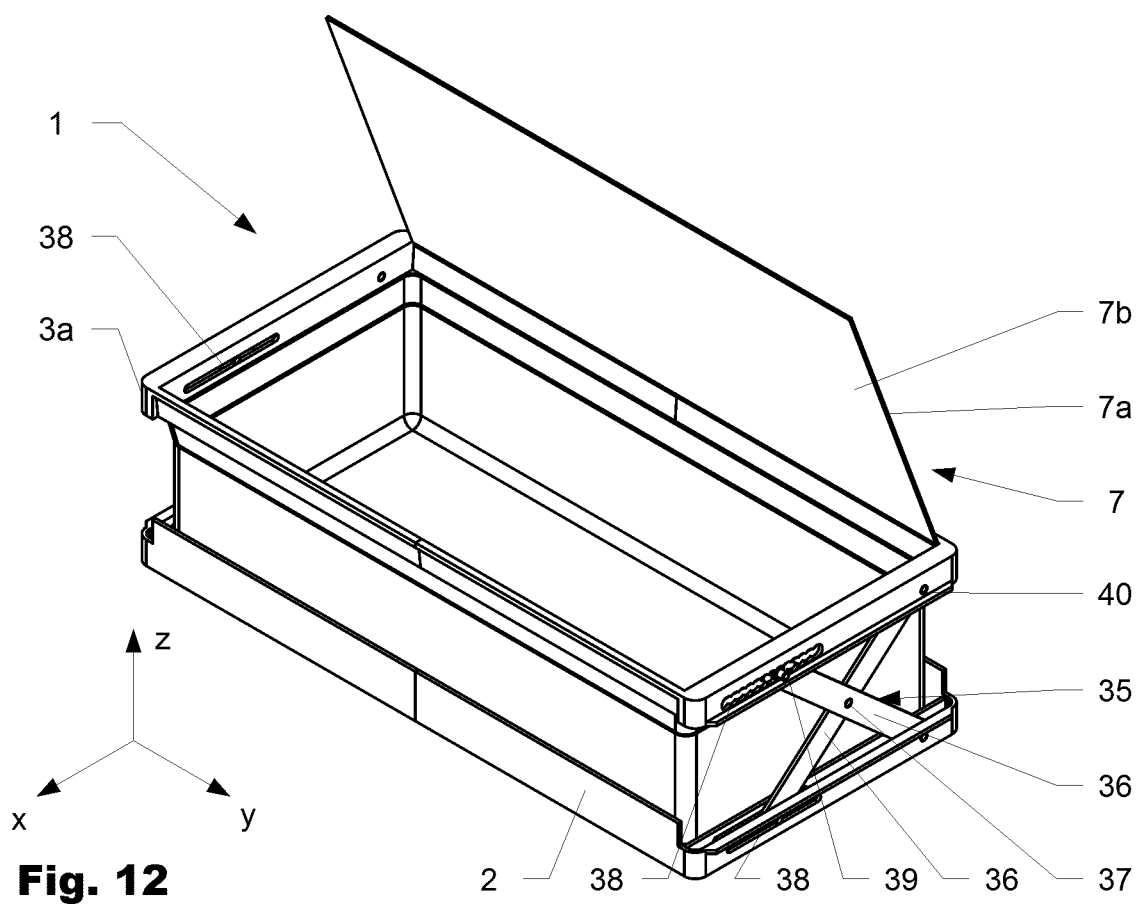
FIG. 12 shows a cargo receptacle in an extended state.

FIG. 12 shows the extended state of the cargo receptacle 1 according to FIG. 11, wherein the cargo volume adjustment mechanism is shown to comprise two scissor-lifts 35 in opened states, the scissor-lifts 35 being arranged at opposite sides of the cargo receptacle 1. Optionally, at least one scissor-lift 35 may be provided at each side of the cargo receptacle 1. Further, the secondary frame 3a comprises the external access 7 to the cargo, in the form of a lid with a hard plastic frame 7a and a textile surface 7b tensioned in the frame and spanning its inner diameter for snugly and protectively covering the cargo of the receptacle when the lid is closed. The textile surface 7b may comprise an elastic fabric, in particular stretch fabric. The scissor-lifts 35 each comprise a first end interconnected to the mount 2 and at least a pair of crossed levers 36 interconnected by a pivot joint 37. The first end of a first lever 36 of each crossed pair is interconnected to the mount 2 at a first anchoring position in the mount 2, for example in a slide channel 38 (described in further detail below) of the side wall of the tray, via a respective first anchoring element 39 interconnected to the respective first lever's first end. The first anchoring element may comprise a pivot pin. The second end of the same respective first lever 36 is interconnected to the secondary frame 3a at a second anchoring position diametrically opposite the first anchoring position in the mount 2, via a respective second anchoring element 40. The second anchoring element 40 may comprise a pivot pin. The converse applies to the second lever 36 of the respective pair of crossed levers, wherein a second end of the respective second lever is interconnected to the secondary frame 3a at a first anchoring position, for example in a slide channel 38 of the secondary frame 3a, via a respective first anchoring element 39 interconnected to the respective second lever's second end. The first end of the same respective second lever 36 is interconnected to the mount 2 at a second anchoring position diametrically opposite the first anchoring position in the secondary frame, via a respective second anchoring element. First anchoring positions are configured to permit pivoting, via different positions in the slide channels 38, about a plurality of rotational positions along the x-axis, while second anchoring positions are configured to permit pivoting of the respective lever's end about a single rotational axis. The first anchoring element 39 is associated with a slide channel 38 and first anchoring position. The second anchoring element 40 is associated with the second anchoring position. In some variations, second anchoring positions may also comprise slide channels.

Each slide channel 38 comprises a surface configured to engage a respective first anchoring element 39, the latter being configured to slide in the slide channel 38 laterally. Further, the surface of at least one of the slide channels 38 may comprise at least one depression, in particular a series of depressions, configured to arrest the respective first anchoring element 39 in various lateral positions along the x-axis shown in the figure. Further, the respective first anchoring element 39 comprises a pre-tensioning element (not shown in detail), such as a spring element pre-tensioned at a first end against the mount 2 or to the secondary frame 3a at the respective first anchoring position, so as to lock the first anchoring element 39 and the scissor-lift 35 in a desired position of extension. At a second end, the spring element may be pre-tensioned against the respective lever of the crossed pair of levers.

The first anchoring element 39 may further comprise a release actuator (not shown in detail), which upon actuation, such as depressing by a finger or a tool, allows the pretensioning element and the associated first anchoring element 39 to be unlocked and slid along the slide channel 38, thereby to unlock and release the scissor-lift 35 from a locked position and allow adjustment of its state of extension.

Further, the ends of the levers 36 may be arranged in slits 41 provided in the mount 2, in particular in the side wall of the tray of the mount 2, and/or in slits 41 provided in the secondary frame 3a.

The levers 36 of the respective crossed pair of levers may contain aluminum or hard plastic as their primary material components. The anchoring elements 39, 40 preferably contain, or are made of, the same material as the levers. However, they may contain another material more resilient against wear and tear. The surfaces of the sliding channels 38 which engage the anchoring elements 39, 40 may comprise a hard metal or hard plastic.

Figure 13:
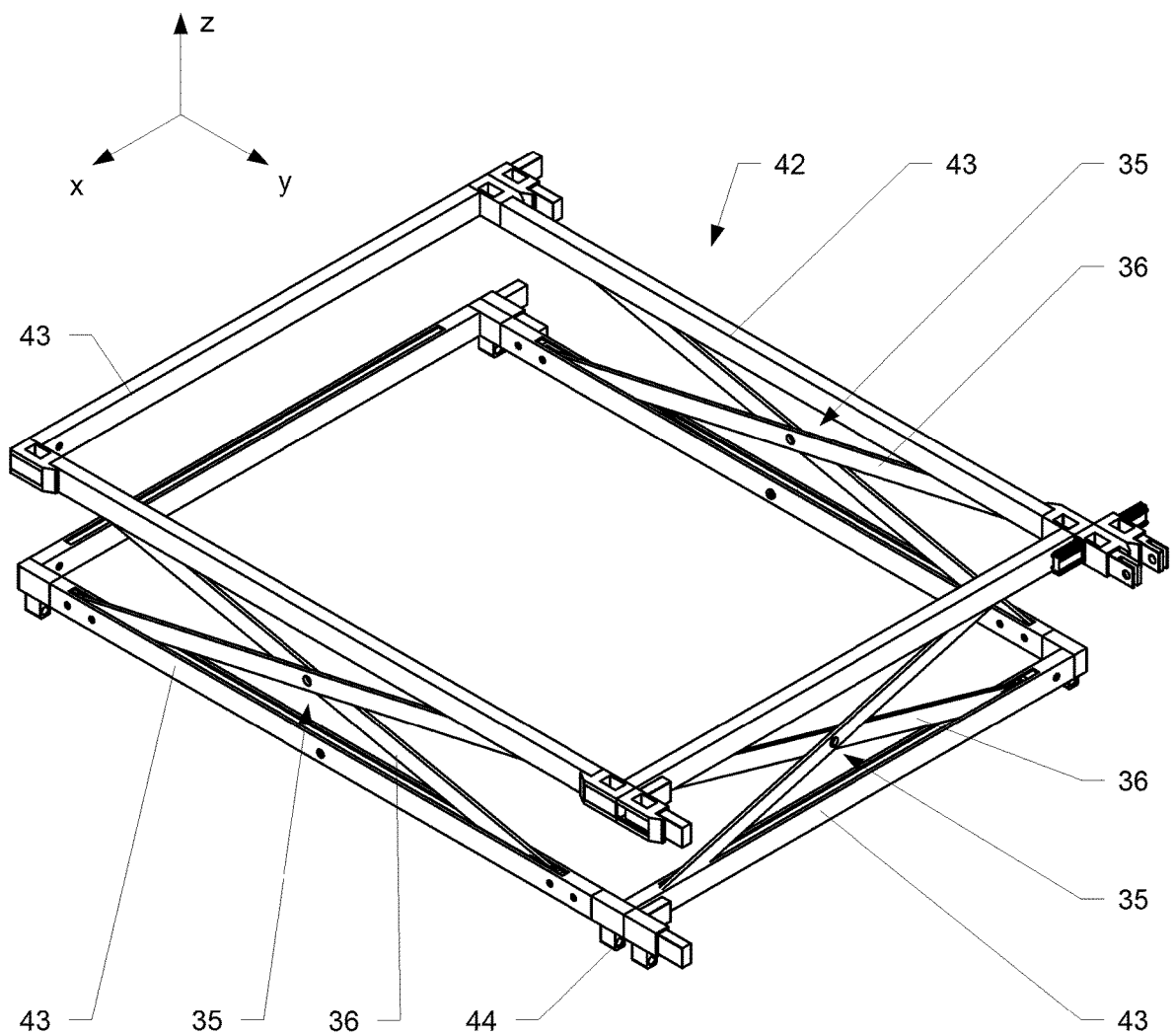
FIG. 13 shows an extender frame assembly.

FIG. 13 shows an extender frame assembly 42 suitable for mounting on the mount 2 of a cargo receptacle 1 as described in this document, including a cargo receptacle 1 including a cargo volume adjustment mechanism as shown in, for example, FIGS. 11 and 12. The extender frame assembly is in particular configured to be mounted onto the tray of the cargo receptacle's mount 2, in particular onto its side wall. The extender frame assembly comprises two interconnected extender frames 43 which are vertically displaceable by means of a cargo volume adjustment mechanism arranged therebetween. The cargo volume adjustment mechanism comprising a plurality of scissor-lifts 35, in the present example three scissor-lifts 35, each scissor lift 35 being interconnected at each of its ends to an extender frame 43. The interconnection of the scissor-lifts 35 to the extender frames 43 may be carried out in the manner of the scissor-lifts 35 interconnected to the mount 2 and to the secondary frame 3a described with reference to the previous figures, in particular with respect to the anchoring elements arranged at the respective scissor-lift lever's end. Optionally, the anchoring elements may comprise pre-tensioning elements and release actuators. Optionally, sliding channels 38 as described with reference to the previous figures may be provided in at least one or in each extender frame 43. A lower extender frame 43 to be interconnected to a cargo receptacle mount 2 or to the secondary frame 3a and comprises a plurality of extender frame stacking aids in the form of lugs or downwardly directed projections 44, whereby the mount 2 or secondary frame 3a of the cargo receptacle 1, in particular the upper face of the side wall of the mount's tray or the upper face of the secondary frame 3a, preferably comprises complementary recesses to engage the respective extender frame projection 44. Preferably, each corner of the downwardly directed face of the lower extender frame 43 comprises such a projection. When the extender assembly 42 is mounted to the mount 2 of the cargo receptacle 1 to the secondary frame 3a, the projections 44 aid in aligning the extender frame assembly 42 with the cargo receptacle 1, in particular stabilizing the stacked arrangement. The upper extender frame 43 may comprise recesses in the manner as described with reference to the cargo receptacle mount 2 or secondary frame 3a. In this way, a plurality of extender frame assemblies 42 may be stacked on top of one the other, whereby their alignment is facilitated and the stacking arrangement stabilized with the aid of the respective recess-projection engagement between abutting extender frames. The top extender frame 43 may comprise an external access to the cargo, such as a lid.

The words used in the specification are words of description rather than limitation, and it is understood that various changes may be made without departing from the spirit and scope of the disclosure.

The invention claimed is:

1. A cargo receptacle cart comprising a polyhedron frame comprising at least one access face for insertion and removal of at least one cargo receptacle, the cargo receptacle comprising:
   i. a mount,
   ii. a flexible member expandable and collapsible in height to a desired expansion state, comprising a first end interconnected to the mount, wherein the flexible member when in an at least partially expanded state bounds a storage volume for holding cargo, and
   iii. an external access to the cargo,
   wherein
   the mount is self-supporting and comprises a frame with a rim, the rim configured for mounting the cargo receptacle on a system of laterally spaced-apart tracks, and
   the cargo receptacle cart further comprising a system of laterally spaced-apart tracks carrying the at least one cargo receptacle by its rim, each track comprising a mounting surface extending laterally between the access face and an opposite face of the frame,
   wherein the flexible member in an at least partially expanded state is raised from the mount, or the flexible member hangs down beyond the level of the tracks and tracks further down if the flexible member is expanded further,
   wherein the flexible member expandable and collapsible in height allows the same cargo receptacle to be useful for holding differently sized cargo, and
   wherein the cargo receptacle cart comprises at least one sensor or detector configured to detect the position and a size of the at least one cargo receptacle supported on its tracks and
   the cargo receptacles are flexibly insertable in a next free space of the cargo receptacle cart to optimize use of storage space, and every cargo receptacle is accessible in the cargo receptacle cart.

2. The cargo receptacle cart according to claim 1, wherein every cargo receptacle is accessible in the cargo receptacle cart following an unlocking procedure.

3. The cargo receptacle cart according to claim 1, wherein the cargo receptacle cart comprises means for locomotion in the form of wheels interconnected to the frame for moving the cart.

4. The cargo receptacle cart according to claim 1, wherein the cargo receptacle cart comprises at least one sensor or detector configured to detect its own position.

5. The cargo receptacle cart according to claim 1, wherein the cargo receptacle cart serves as a cargo hold that can be moved and as a means for cargo transport that can be parked at least temporarily, such that the cargo need not be additionally packaged beyond the original packing provided by the manufacturer or packaging firm of the product for transport purposes.

6. The cargo receptacle cart according to claim 1, wherein the frame is rectangular and the rim is arranged at least at two opposite sides of the frame.

7. The cargo receptacle cart according to claim 1, the cargo receptacle further comprising an ID-tag or optical indicator to indicate the size and fill status of the cargo receptacle as vacant, partially vacant, or full.

8. The cargo receptacle cart according to claim 1, wherein the mount includes a tray comprising a base plate, a side wall extending from the base plate, and a rim extending laterally from the side wall.

9. The cargo receptacle cart according to claim 1, the cargo receptacle further comprising a cargo volume adjustment mechanism configured to increase and decrease the interior volume of the cargo receptacle, wherein the cargo volume adjustment mechanism is extendible and collapsible in height.

10. The cargo receptacle cart according to claim 9, wherein the cargo volume adjustment mechanism is removably interconnected to the mount, and/or the flexible member is removably attached to the mount, wherein the flexible member is a removable bag or a flexible box.

11. The cargo receptacle cart according to claim 9, the cargo receptacle comprising
a secondary frame, the secondary frame and the mount being interconnected in a mutually displaceable manner,
wherein the cargo volume adjustment mechanism comprises a first end interconnected to the mount and a second end interconnected to the secondary frame.

12. The cargo receptacle cart according to claim 11, wherein the cargo volume adjust mechanism comprises a spanning element, the spanning element comprising at least one scissor-lift.

13. The cargo receptacle cart according to claim 12, wherein the mount comprises a pair of slide channels, the at least one scissor-lift comprising a first anchoring element configured to slide in the slide channel.

14. The cargo receptacle cart according to claim 13, wherein the first anchoring element comprises a pre-tensioning element configured to be pre-tensioned against the mount and the scissor-lift so as to fix the first anchoring element in one position.

15. The cargo receptacle cart according to claim 14, wherein the first anchoring element comprises a release actuator configured to allow the first anchoring element to be slid to another position.

16. A cargo logistics method:
that utilizes a first cargo receptacle cart according to claim 1 and a second cargo receptacle cart according to claim 1, each further comprising wheels interconnected to the frame for moving the respective cargo receptacle cart,
moving the first cargo receptacle cart next to the second cargo receptacle cart, and
transferring the at least one cargo receptacle from the first cargo receptacle cart to the second cargo receptacle cart,
wherein the cargo receptacles are flexibly inserted in a next free space of the cargo receptacle cart to optimize use of storage space, and every cargo receptacle is accessible in the cargo receptacle cart.

17. The cargo logistics method according to claim 16, further utilizing at least one picking robot, the cargo logistics method further comprising:
picking cargo, via the at least one picking robot, from at least one cargo holding area or cargo storage unit; and
places the cargo, via the at least one picking robot, into the at least one cargo receptacle.

18. The cargo logistics method according to one of claim 16, further utilizing a vehicle comprising:
i. a drive for moving the vehicle,
ii. a holder for holding the first cargo receptacle cart and the second cargo receptacle cart, and
iii. an electronic circuit configured to control the drive and the holder, the cargo logistics method further comprising:
moving, via the vehicle, the first cargo receptacle cart next to the second cargo receptacle cart, and
the electronic circuit comprises sensors configured to detect positions and sizes of cargo receptacles, in particular cargo receptacles contained in cargo receptacle carts.

19. The cargo logistics method according to claim 18, wherein the vehicle comprises a transfer device configured to move at least one cargo receptacle from the first cargo receptacle cart into the second cargo receptacle cart and to remove the at least one cargo receptacle therefrom, wherein the electronic circuit is configured to control the transfer device, the cargo logistics method further comprising:
moving, via the transfer device, the at least one cargo receptacle from the first cargo receptacle cart into the second cargo receptacle cart.

20. Method according to claim 19, wherein the transfer device comprises one or more of at least one lifting device which is rotatable, a push-pull mechanism, and at least one robotic arm.

21. The cargo logistics method of claim 20,
wherein the transfer device comprises at least one lifting device which is laterally shiftable from one side of the transfer device to the other.

22. A cargo logistics method:
that utilizes a first cargo receptacle cart according to claim 1 and a second cargo receptacle cart according to claim 1, each further comprising wheels interconnected to the frame for moving the respective cargo receptacle cart,
moving the first cargo receptacle cart next to the second cargo receptacle cart, and
transferring the at least one cargo receptacle from the first cargo receptacle cart to the second cargo receptacle cart, via a transfer device, wherein the transfer device comprises at least one lifting device which is rotatable, a push-pull mechanism, and at least one robotic arm,
wherein the cargo receptacles are flexibly inserted in a next free space of the cargo receptacle cart to optimize use of storage space, and every cargo receptacle is accessible in the cargo receptacle cart.

23. The cargo logistics method of claim 22,
wherein the transfer device comprises at least one lifting device which is laterally shiftable from one side of the transfer device to the other.

* * * * *